(12) United States Patent
Kahn et al.

(10) Patent No.: US 7,502,112 B2
(45) Date of Patent: Mar. 10, 2009

(54) COLORIMETRIC DEVICE AND COLOUR DETERMINATION PROCESS

(75) Inventors: David Alexander Kahn, Nepean (CA); John C. B. Davey, Nepean (CA)

(73) Assignee: Brytech Inc., Ottawa (CA)

( * ) Notice: Subject to any disclaimer, the term of this patent is extended or adjusted under 35 U.S.C. 154(b) by 114 days.

(21) Appl. No.: 11/311,310

(22) Filed: Dec. 20, 2005

(65) Prior Publication Data

US 2006/0139644 A1 Jun. 29, 2006

Related U.S. Application Data

(60) Provisional application No. 60/648,703, filed on Feb. 2, 2005, provisional application No. 60/638,345, filed on Dec. 23, 2004.

(51) Int. Cl.
*G01N 21/25* (2006.01)

(52) U.S. Cl. .................. 356/406; 356/405; 356/420

(58) Field of Classification Search ......... 356/402–425, 356/30, 446
See application file for complete search history.

(56) References Cited

U.S. PATENT DOCUMENTS

| | | | |
|---|---|---|---|
| 3,060,790 A | | 10/1962 | Ward |
| 3,512,893 A | | 5/1970 | Faulhaber et al. |
| 3,910,701 A | * | 10/1975 | Henderson et al. ............ 356/39 |
| 4,917,500 A | | 4/1990 | Lugos |
| 5,021,645 A | | 6/1991 | Satula et al. |
| 5,137,364 A | * | 8/1992 | McCarthy .................. 356/402 |
| 5,303,037 A | | 4/1994 | Taranowski |
| 5,615,005 A | * | 3/1997 | Valente et al. ................ 356/30 |
| 5,671,059 A | | 9/1997 | Vincent |
| 5,838,451 A | | 11/1998 | McCarthy |
| 5,963,333 A | | 10/1999 | Walowit et al. |
| 6,020,583 A | | 2/2000 | Walowit et al. |
| 6,147,761 A | | 11/2000 | Walowit et al. |

(Continued)

FOREIGN PATENT DOCUMENTS

DE 41 20 749 8/1990

(Continued)

OTHER PUBLICATIONS

Jackie Cairns, "Speaking of Colours—A Comparison of Two Talking Detectors", Blind Citizens Australia, Parent News, Apr. 2003, pp. 4-6.

*Primary Examiner*—Kara E Geisel
*Assistant Examiner*—Abdullahi Nur
(74) *Attorney, Agent, or Firm*—Thomas Adams

(57) ABSTRACT

A hand-held colorimetric device (101) suitable for use by blind or color-blind individuals to determine the color of a surface-under-test (SUT), for example of a fabric, has an aperture (110) which, in use, is covered by the SUT (113) whose color is to be determined. Six LEDs (115A, 115B, 116B, 117A and 117B) arranged in pairs (115A/115B, 116A/116B, 117a/117B) emitting red/orange, green, and blue light illuminate the SUT and diffuse reflections therefrom containing red/orange, green, and blue spectrum sample values are used to determine the luminous reflectivity and chromaticity values for the color of the SUT. The measured values are compared with colorimetric values of reference surfaces to determine the color of the SUT. The colorimetric device may output the name of the color aurally.

42 Claims, 12 Drawing Sheets

U.S. PATENT DOCUMENTS

| | | |
|---|---|---|
| 6,157,454 A | 12/2000 | Wagner et al. |
| 6,323,481 B2 | 11/2001 | Ueki |
| 6,583,880 B2 | 6/2003 | Berstis |
| 6,674,530 B2 | 1/2004 | Berstis |
| 7,304,743 B2 * | 12/2007 | Dosmann et al. ............ 356/446 |
| 2003/0011832 A1 * | 1/2003 | Chang ........................ 358/518 |

FOREIGN PATENT DOCUMENTS

| | | |
|---|---|---|
| EP | 0 114 515 | 12/1983 |

* cited by examiner

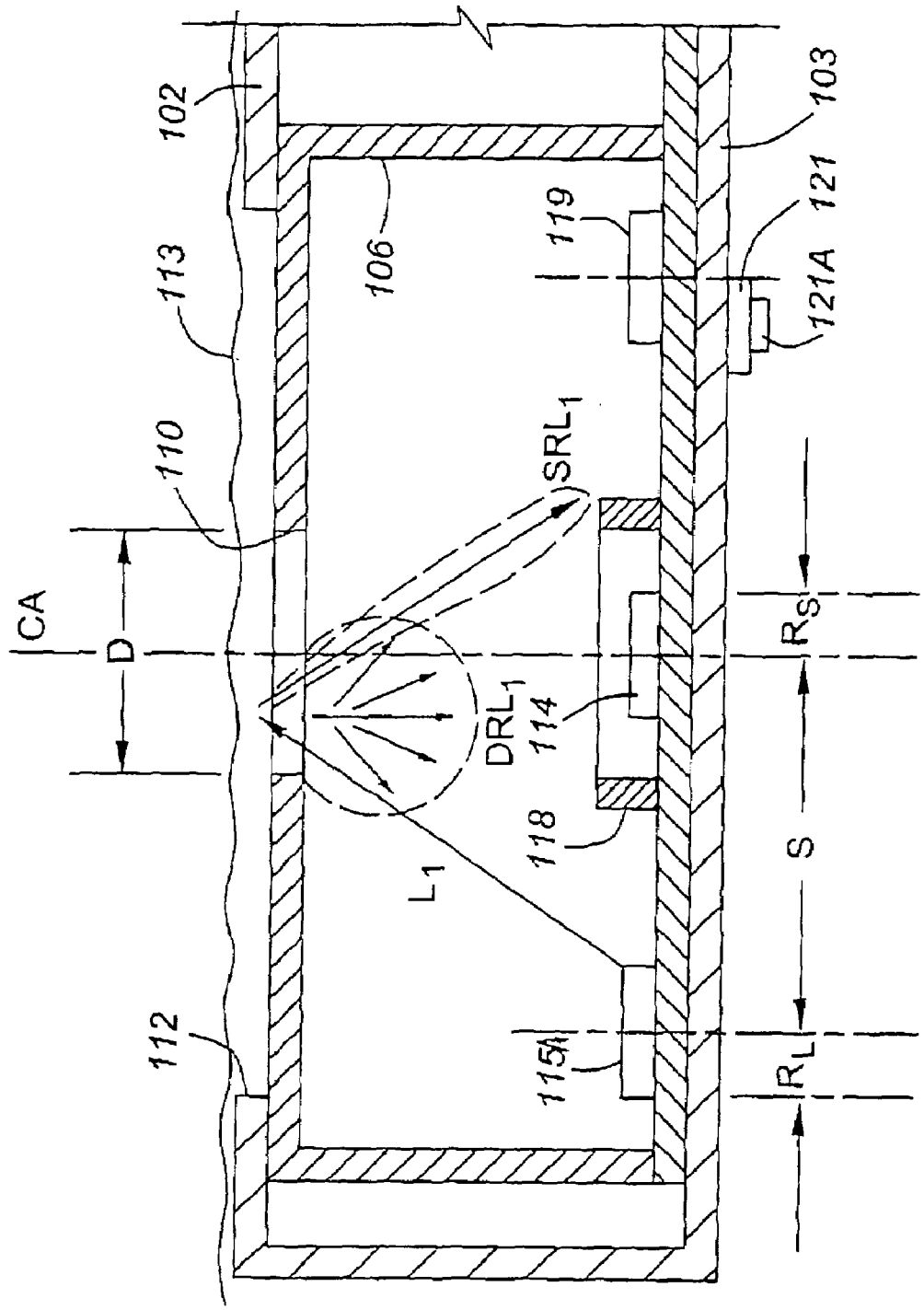

COLORIMETRIC DEVICE AND COLOUR DETERMINATION PROCESS

CROSS-REFERENCE TO RELATED APPLICATIONS

This application claims priority from U.S. Provisional patent application Ser. No. 60/638,345, filed Dec. 23, 2004 and U.S. Provisional patent application Ser. No., 60/648,703, filed Feb. 2, 2005, the contents of both of which are incorporated herein by reference.

BACKGROUND OF THE INVENTION

1. Field of the Invention

This invention relates to colorimetric devices, and a colour determination process for use therewith. The invention is applicable especially to colorimetric devices that identify the measured colour by name or by standardized coordinates.

2. Description of the Prior Art

People who are blind or colour-blind have difficulties when choosing their clothes from their wardrobes. They would be greatly assisted by a device that would measure the colour of items such as socks, shoes, shirts, pants etc., and announce the results in an audible or other non-visual format. To meet the requirements of this market, such a device preferably should be easily portable, preferably handheld, rugged and inexpensive, There are many U.S. patents which disclose devices for determining colour, including U.S. Pat. No. 3,060,790 (Ward); U.S. Pat. No. 3,512,893 (Faulhaber et al); U.S. Pat. No. 4,917,500 (Lugos); U.S. Pat. No. 5,021,645 (Satula et al.); U.S. Pat. No. 5,303,037 (Taranowski); U.S. Pat. No. 5,838,451 (McCarthy); U.S. Pat. Nos. 5,963,333, 6,0202, 583, and 6,147,761 by (Walowit et al.); U.S. Pat. No. 6,157, 454 (Wagner et al.); and U.S. Pat. No. 6,323,481 (Ueki). A disadvantage of these devices, however, is that they require the use of optical components, such as optical filters, light pipes/guides, lenses, mirrors, and reflector cones, between the light source(s) and detector(s), which increases cost and reduces ruggedness.

It is possible to dispense with such intervening optical components in certain situations. For example, U.S. Pat. No. 3,910,701 (Henderson et al.) discloses photometric instruments having a plurality of light emitting diodes (LEDs) and at least one photodetector; one of which instruments has no intervening optics. Henderson et al. were not concerned with determining colour, however, but primarily with the detection of diseases in humans and plants. Their focus was upon determining reflectivity, absorption and/or transmission at different wavelengths rather than determining the colour of a surface-under-test (SUT), i.e., spectrometric rather than colorimetric.

Another example, disclosed in U.S. Pat. No. 5,671,059 (Vincent), is a colorimeter for a desktop printer which uses electroluminescent omitters without intervening lenses or other optical components to measure the colours being printed and which compares their characteristics with the digital image data used to generate them and so allow for correction of errors. When suggesting that tis colorimeter could be used in a hand-held colour probe. However, Vincent states that a lens, optical reflector or other optical components positioned between the colorimeter and a colour sample may be employed to optimize the optical performance in a desired application. This would, of course, increase expense and reduce ruggedness.

U.S. Pat. No. 5,137,364, also by McCarthy, discloses a colorimeter which uses a plurality of light emitting diodes surrounding a set of photodetector with a shield for preventing direct irradiation of the photodetectors by the emitters, with a first set of optical fibers coupling each of the light emitting diodes to the sample and a second set of optical fibers coupling the sample to the photodetectors.

A further disadvantage of the foregoing devices, except that disclosed by Wagner et al. and the three disclosed by Walowit et al., is that they do not address the problem of specular reflection affecting colour determination. Walowit et al. addresses the problem and uses angled reflective surfaces to constrain the angle of incidence of the light upon the sample. Wagner et al. do so by means of a bore whose length and diameter are chosen to prevent specular reflections from reaching the detector.

Reflection from an incident ray or pencil of light may be categorized into two parts; a diffuse reflection part and a specular reflection part. Specular reflection is characteristic of a smooth, glossy surface, the reflection from a good mirror being entirely specular. Diffuse reflection is characteristic of a rough or matte surface and, in the Lambertian model of diffuse reflection, is scattered into a hemisphere, i.e., in all directions.

The colour of a surface is determined by the spectral variation of the reflectivity over the visible range. However, the spectral variation of the specular component may be (and usually is) not the same as the spectral variation of the diffuse component. In fact, for many common surfaces, the specular reflectivity is substantially independent of colour and therefore the spectrum of the reflected light is substantially the same as that of the incident light.

For almost all purposes, the colour of a surface is deemed to be determined by the spectral characteristics of the diffuse reflectivity. If specularly reflected components of the reflected light are collected for measurement, they will usually result in errors in the diffuse colour determination of the surface. While materials such as cloth and fabric generally have low levels of specular reflectivity and the measurement of their colours would not be greatly affected by including the specular components, measurements of more glossy surfaces characteristic of leather or vinyl for shoes or jackets would be severely affected.

These limitations are addressed by the present applicant's copending international patent application No. PCT/CA2003/000326, published under number WO 2004/07931 4, which discloses a set of light sources and a photodetector mutually spaced apart and oriented so that substantially all of the light from each light source that is specularly reflected by a SUT is directed away from the photodetector, yet the photodetector will receive at least a portion of the diffusely reflected light from each light source and produce a corresponding electrical output signal having a plurality of values each representing the diffuse reflection characteristics of the SUT for the spectral segment of the corresponding light source. The contents of PCT/CA 2003/000326) are incorporated herein by reference and the reader is directed thereto for reference.

While the above described known colorimeters may work satisfactorily on isotropic flat surfaces, such as coloured paper, they are not necessarily entirely satisfactory for determining the colour of non-isotropic textured surfaces, such as fabrics which have different luminous reflectivity depending upon the orientations of the illumination and viewing axes relative to the nap of the pile, or, where the fabric is woven, the direction of the fibres. Thus, two measurements taken with the same known colorimeter, but with the colorimeter orientated differently relative to the nap for each measurement, might be different. For example, one measurement might indicate that the fabric was light green and the other measurement might indicate that it was dark green. Moreover, measurement accuracy also may be impaired if the material is a fabric that has different colours of thread extending in different directions, for example warp and weft of different colours, giving a different average color reading from different directions.

One object of the present invention, according to a first aspect to be described hereinafter, is to at least mitigate these limitations of such known colorimeters, or at least provide an alternative.

A further limitation of some of the above-mentioned devices concerns the colour determination process. Typically, the colour is determined by first determining the spectrum $S(\lambda)$ of the reflected light and then correlating this information with standard colorimetric data, conveniently using a standard set of colour matching functions as defined by the Commission Internationale d'Éclairage (CIE). There are several methods of measuring the spectrum. To obtain a high spectral resolution, a large number of samples would be required. This type of measurement is typified by the spectral scanning technique.

In one such spectral scanning approach, the surface is illuminated with white light as described above and the reflected light spectrum analysed with a graded filter wheel that scans a narrow spectral channel across the visible spectrum, resulting in a time varying signal where the time is related to the wavelength. In a similar approach, the illumination from the white light source is directed through the narrow spectral channel prior to being reflected from the surface under test. With a scanning measurement, the number of independent samples is equal to the ration of the total half-power visible spectrum width, e.g. 200 nm, to the sampling width of the scanner.

In these methods, the illuminating light source may instead be non-white but nevertheless cover the entire visible spectrum. Similarly, the sensor response may vary across the spectrum. In these cases, the transformation must be weighted by the spectrum of the illumination and the sensor response. The above techniques are ideal inasmuch as the entire spectral region of reflectance is measured with a high resolution and the transformation to colour co-ordinates can be exact. However, there are issues of complexity, cost and robustness associated with graded circular filters and the associated rotating mechanisms. Also, a spectrum measurement with a high wavelength resolution is not necessary for the accurate determination of colour.

Thus, the provision of physical filters replicating the CIE spectral functions is not entirely practical and, even to the limited extent that it might be practical, would be expensive. The human eye, that constitutes the basis of colour, uses only three spectral samples. These samples overlap to cover the visible spectrum between 400 nm and 700 nm, but differ from each other in their spacing and shape. In particular, two of the three spectral samples are relatively close together at about 600 nm and 550 nm, whereas the third spectral sample is relatively distant at about 450 nm. Clearly, a colorimeter requiring only a few spectral samples would be less complex and expensive than one requiring a high-resolution measurement of the spectrum as it is compatible with a static design with no moving parts.

One sampling technique is to use a broadband (white) light source in combination with a set of optical bandpass filters that define the location and width of the spectral samples. The filters may be situated before or after the light reflects from the SUT. The main cost of this approach is the provision of the optical system that typically includes beam-splitters as well as filters.

Alternatively, and less expensively, the spectral sampling can be implemented by illuminating the SUT with a set of light emitting diodes (LEDs), each having a different central wavelength, and collecting the reflected light using a single broadband photodetector such as a silicon photodiode. The above-mentioned U.S. Pat. No. 3,910,701 (Henderson et al.) discloses a spectrometric instrument having a plurality of LEDs and at least one photodetector but which, in order to cover a relatively wide range, uses several interchangeable modules, each containing a different set of LEDs.

As the total half-power visible spectrum is about 200 nm in width and each LED-based sample typically is about 40 nm in width, about five such spectral samples are required to cover the visible region. For example, U.S. Pat. No. 3,060,790 (Ward) discloses a colorimeter based on the use of five LED-sourced sample wavelengths and suitable photosensors enabling chromaticity co-ordinates to be computed by simple electrical circuits. Disadvantageously, using multiple light sources and detectors increases complexity and cost.

Another disadvantage, identified in the discussion of prior art in U.S. Pat. No. 5,838,451 (McCarthy), was the lack of availability of light sources with peak wavelengths in the region around 550 nm. According to McCarthy, prior art devices used multiple emitters and detectors with peak responses outside that region but whose response curves extended into it. McCarthy addressed this perceived deficiency by using newly-available LEDs with peak energies in the region of 530 nm. This enabled him to obtain coverage of the required spectrum with a set of only four LEDs, providing they had specific overlapping wavelength distributions. This is still not entirely satisfactory since LEDs that are readily available and inexpensive do not necessarily have the required wavelength distributions or values.

The above-mentioned international patent application No. PCT/CA2003/000326 addressed this limitation by means of a sampling technique using light sources having relatively narrow wavelength distributions and which need not coincide with the peaks identified in the CIE model. The colorimeter used three LED's emitting orange/red, green, and blue light, respectively, to illuminate the surface. Diffuse reflections from the SUT containing orange/red, green, and blue spectra were used to determine the luminous reflectivity and chromaticity values for the colour of the surface, the luminous reflectivity being a measure of the surface's reflection efficiency. Processing of the three colour samples to convert them to CIE coordinates used a transform algorithm trained using a selection of reference colours on a reference colour chart.

The specific colour being measured was determined from the selection of reference CIE coordinates using a least squares algorithm. While this is particularly suitable for use where the possible colours of the surfaces are known a priori, as might be the case when sorting articles according to colour in a manufacturing environment, it has limitations if used for identifying a large number of colours that are not known specifically a priori. An object of the present invention, according to a second aspect to be described hereinafter, is to at least mitigate this limitation of such known color determination process, or at least provide an alternative.

SUMMARY OF THE INVENTION

According to a first aspect of the invention, there is provided a colorimetric device for determining the colour of a surface which, when illuminated, will produce at least diffusely reflected light, comprising:

a housing including a wall having an aperture therein, interior surfaces of the housing being adapted to absorb light impinging thereon, the aperture to be covered by the surface-under-test (SUT) when the colorimeter is in use;

light source means and photodetector means disposed in the housing and generally facing the aperture, the light source means being responsive to electrical drive signals for omitting light in at least three different spectral segments each encompassing a different band of wavelengths, the light source means being spaced apart so as to direct light of a particular said wavelength band towards the aperture from a least two directions, the photodetector means being disposed so as to receive said diffusely reflected light after reflection from said SUT covering the aperture while substantially excluding specularly reflected light, if any;

the colorimetric device further comprising:

a drive unit for supplying said electrical drive signals to the light source means so as to cause them to emit said light of each of said different wavelength bands and means for processing the corresponding electrical output signal from the photodetector means to provide values each corresponding to a respective one of the different wavelength bands, the drive unit and processing means being so configured that each of said values is distinct from the other values, the processing means being configured to derive from the values a set of colorimetric coordinates identifying the colour of the SUT.

The colour identification signal may take the form of standard coordinates for the colour, for example as defined in one or more Commission Internationale d'Éclairage (CIE) standards.

Alternatively, the colour identification signal may comprise the name of the colour, conveniently enunciated by a speech synthesizer and/or displayed and/or outputted tactilely.

In preferred embodiments, the light source means and the photodetector means are spaced apart so that substantially all of light from said light source means that is specularly reflected by the SUT is directed away from the PD and the PD will receive at least a portion of the diffusely reflected light from each light source and produce a corresponding electrical output signal having a plurality of values each dependent upon the diffuse reflection characteristics of the SUT for the corresponding wavelength band.

The light sources means may comprise three pairs of light sources, the light sources in each pair being disposed either side of the photodetector means and emitting light of substantially the same wavelength, the different pairs emitting different wavelengths of light and being angularly spaced apart around the photodetector means, the processor being operable to energize each pair of light sources simultaneously to obtain a reading at the corresponding wavelength.

Preferably, the six light sources are spaced at equal intervals around the photodetector, the light sources in each pair being opposite each other.

Alternatively, and preferably, the light source means may comprise three sets, each set comprising first, second and third substantially co-located light sources for supplying light at first, second and third wavelengths, respectively, each in a respective one of the three different spectral segments, the sets being angularly spaced apart around the photodetector means, the processor being operable to energize the first light sources simultaneously to obtain a reading at the first wavelength, energize the second light sources simultaneously to obtain a reading at the second wavelength, and energize the third light sources simultaneously to obtain a reading at the third wavelength.

Preferably, the first, second and third light sources in each set are packaged as a single semiconductor device, such as a so-called tri-colour LED. The corresponding light sources in each set, i.e., emitting light having substantially the same wavelength, may be energized simultaneously, conveniently by using the same drive signal to operate all of the light sources. Alternatively, the corresponding light sources in each set may be energized in quick succession and the successive measurements combined.

In one embodiment, the processor means uses a set of stored/predetermined transform coefficients to compute from the electrical signal a set of colorimetxic coordinates including luminous reflectivity (Y) and chromaticity values (u,v) representing the colour of the SUT;

wherein the processor means determines the colour of the SUT by determining whether or not the calculated colorimetric coordinates are within any one of a plurality of previously-defined contiguous volumes in three-dimensional colour space, the unknown colour being determined as the colour represented byte volume encompassing the calculated coordinates.

Preferably, each of said identifiers is associated with a particular colour.

The colorimetric device may further comprise means for outputting the name of the particular colour audibly and/or visually and/or tactilely.

The stored transform coefficients may be derived prior to normal use by using the same (or a similar) colorimeter to obtain colorimetric coordinates for each of a plurality of reference surfaces whose colorimetric coordinates (egg., CIE coordinates) are known, and using a best fit routine between the obtained colorimetric coordinates and the corresponding known coordinates.

According to a third aspect of the invention, there is provided a colorimetric device for determining the colour of a SUT which, when illuminated, will produce at least diffusely reflected light, comprising:

a sensor unit having light source means for irradiating a SUT, photodetector means for detecting light reflected from the SUT and producing a corresponding electrical signal, and processor means for using a set of stored/predetermined transform coefficients to compute from the electrical signal a set of colorimetric coordinates including luminous reflectivity (Y) and chromaticity values (u,v) together representing the colour of the SUT;

the processor means storing a plurality of sets of colorimetric coordinates corresponding, respectively, to a plurality of known colours, and for using a best fit algorithm to determine the known colour coordinates closest to the calculated coordinates of the colour of the SUT and adopts said known colour coordinates as representative of the colour of the SUT.

According to a fourth aspect of the invention, there is provided a method of determining an unknown colour of a substance comprising the steps of:

(i) irradiating the substance using light in at least two, preferably three different spectral segments each encompassing a different band of wavelengths, (ii) detecting light from the substance and producing a corresponding electrical signal, and (iii) using a set of stored/predetermined transform coefficients, calculating from the electrical signal a set of colorimetric coordinates including luminous reflectivity (Y) and chromaticity values (u,v) representing the colour of the SUT;

(iv) determining whether or not the calculated colorimetric coordinates are within any one of a plurality of previously-defined contiguous volumes in three-dimensional colour space, the unknown colour being determined as the colour represented by the volume encompassing the calculated coordinates.

Preferably, each colour volume comprises at least one elemental volume defined by and between saturation limits, luminosity limits and hue angle limits, and the determining step determines whether or not the calculated coordinates lie within said elemental volume.

Each colour volume may comprise a plurality of said elemental volumes that are each contiguous with one or more neighbouring elemental volumes.

The elemental volumes need not have the same volumes but have different volumes.

In preferred embodiments of any of the foregoing aspects of the invention, the hue angles and saturation are measured relative to an achromatic point that is predetermined empirically by measuring several grey-scale samples, preferably including black and white, and averaging the measurements.

According to yet another aspect of the invention, there is provided an alternative method of determining an unknown colour of a substance comprising a best fit algorithm for determining which of a plurality of sets of coordinates of a corresponding plurality of reference colours is closest to the coordinates of the unknown colour.

Various features, advantages and objects of the invention will become apparent from the following description of a preferred embodiment which is described by way of example only with reference to the accompanying drawings.

BRIEF DESCRIPTION OF THE DRAWINGS

FIGS. 5A, 5B and 5C are partial cross-sectional views of a sensor unit of the colorimetric device which incorporate ray diagrams;

DETAIL DESCRIPTION OF A PREFERRED EMBODIMENT

Figure 1:
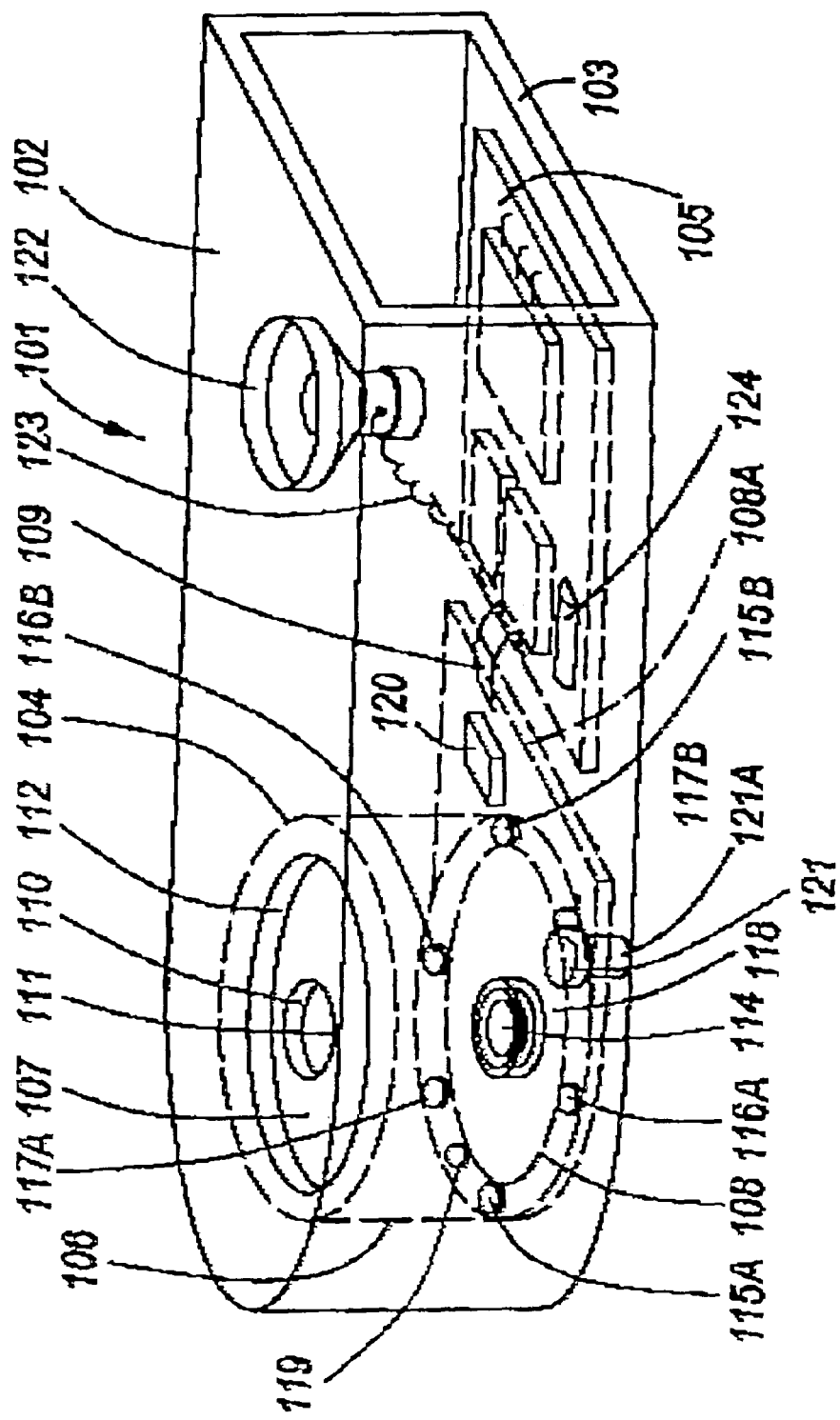
FIG. 1 is a simplified perspective view of a colorimetric device.

FIG. 1 is a perspective view of a colorimetric device, specifically a colorimeter 101 comprising a palm-sized casing 102, shown with one end removed, and a base 103. A sensor unit 104 is mounted upon the base 103 at one end and a printed circuit board (PCB) 105 is mounted upon the base 103 at its opposite end.

The sensor unit 102 comprises a cylindrical housing 106 closed at one end by an integral end wall 107 and at its opposite end by a second printed circuit board 108 which has a plinth portion 108A extending beyond the housing 106 towards the first printed circuit board 105, to which it is connected by a cable 109 The second printed circuit board 108 seals that end of the housing 106 and mounts the sensor unit 102 upon the base 103.

The length of the housing 106 is such that the end wall 107 abuts the inner surface of the casing 102. A central aperture 110 in the end wall 107 is sealed by a transparent window element 111. The casing 102 has a hole 112 which is concentric with, but has a diameter much larger than, the aperture 110, so that, when a user places the colorimeter 101 onto a surface-under-test (SUT) 113 (see FIG. 5A), e.g. a piece of clothing, whose colour is to be determined, the aperture 110 is covered by the SUT 113.

The sealing of the housing 106 by the window 111 and PCB 108A protects against the ingress of contaminants, such as dust and moisture. A photodetector (PD) 114 is mounted on the PCB 108A in the centre of the sensor housing 106 and opposite the aperture 110. Thus, the aperture 110, hole 112 and PD 114 are aligned on the cylindrical axis CA (see FIG. 5A) of housing 106.

Six light sources 115A, 115B, 116A, 116B, 117A and 117B, each comprising a light emitting diode (LED) are mounted within housing 106 upon the second PCB 108. The six LEDs 115A, 115B, 116A, 116B, 117A and 117B are angularly spaced apart at equal intervals around the photodetector 114 and are equidistant from it. Each pair of diametrically opposite LEDs, 115A/115B, 116A/116B and 117A/117B, emit light at the same wavelength, while the three pairs emit light at three different wavelengths, respectively. The LEDs and the PD 114 are of the surface mount device type without any lenses. The LEDs and the PD 114 are semiconductor devices of planar construction with wide angle emission and detection characteristics, respectively. A low cylindrical shield 118 surrounding the PD 114 prevents light from any of the LEDs from directly impinging upon the PD 114. The interior of the housing 106 is blackened to minimize any stray reflections from impinging on the PD 114.

The LED pairs 115A/115B, 116A/116B and 117A/117B emit red/orange, green and blue light, respectively, with spectral maxima of their emission wavelengths at approximately 610 nm (red/orange), 555 nm (green), and 445 nm (blue), respectively. The PD 114 is a silicon photodiode capable of converting light having the emission wavelengths of the LEDs into an electrical signal, i.e. a photocurrent. A temperature sensor 119 for measuring ambient temperature is similarly mounted within the housing 106 upon PCB 108, the temperature information being used for making software-based temperature compensations as will be described hereinafter.

Analog electronic circuitry 120 for processing the electrical signal from the PD 114 is mounted upon the PCB 108. It could be provided on the underside providing that no through holes compromise the seal. A user-operable pushbutton on/off switch 121 is mounted to the base 103 with the button 121A protruding through the base 103 for access by the user. A loudspeaker 122 is attached by its frame to the inner surface of the casing 102 at a position adjacent the first PCB 105 and is connected thereto by a cable 123.

Figure 2:
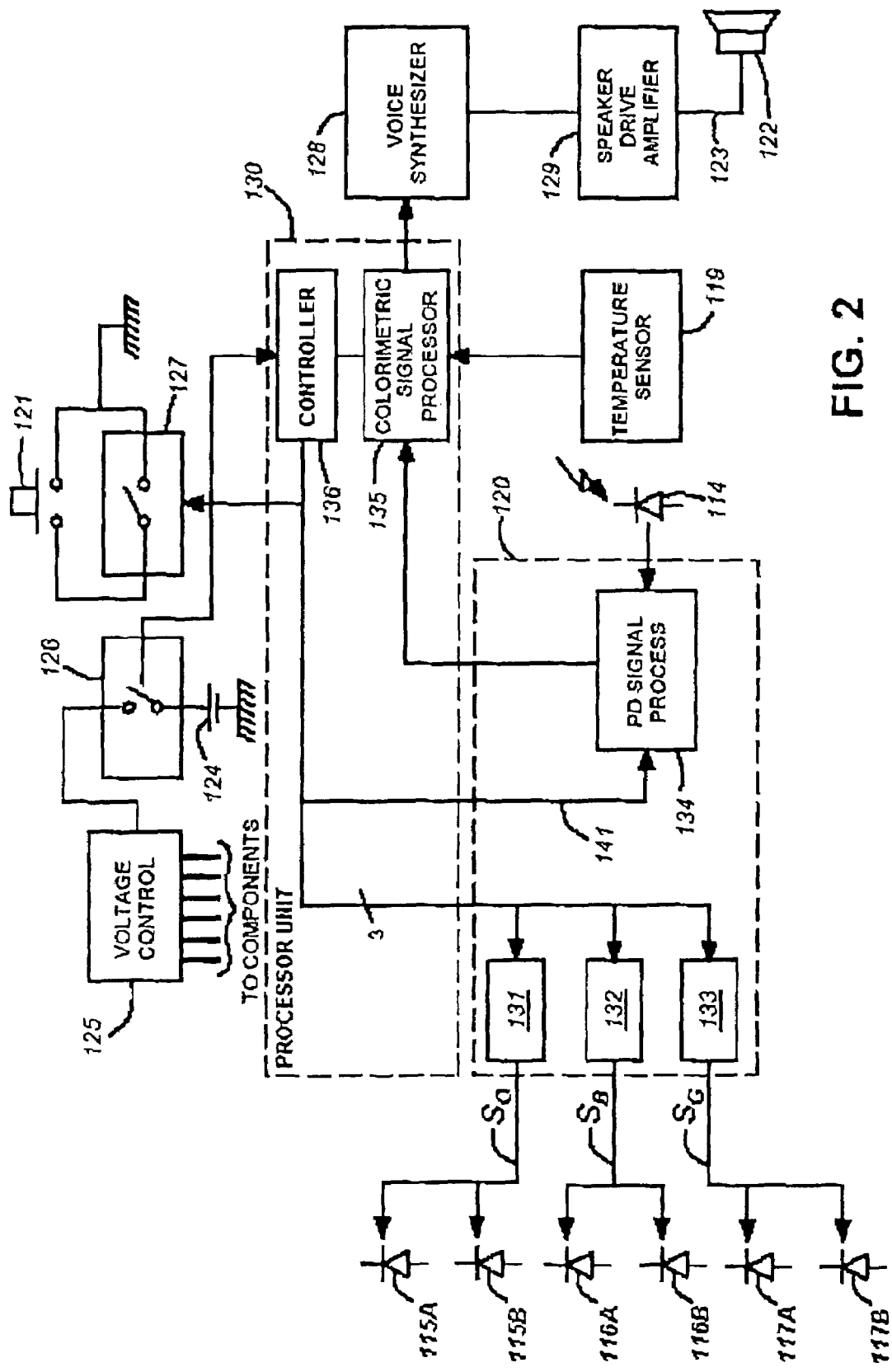
FIG. 2 is a schematic block diagram of electronic circuitry in the colorimetric device.

Referring also to FIG. 2, the first PCB 105 carries a battery 124, a voltage converter unit 125, a PMOS switch 126, an NMOS switch 127, a voice/speech synthesizer 128, a speaker drive amplifier 129, and a processor unit 30.

As shown in FIG. 2, the analog circuitry 120 comprises three precision drive amplifiers 131, 132 and 133 for driving the LED pairs 115A/115B, 116A/116B and 117A/117B, respectively, and signal processing circuit 134 for processing the electrical signal (current) from photodetector 114. While all of the analog processing circuit may be located on PCB 108, as shown in FIG. 1, the LED precision drive amplifiers 131, 132 and 133 could be provided on PCB 108, if more convenient.

The processor unit 130 includes a colorimetric signal processor 135 which receives signals from the PD analog processing circuit 134 and the temperature sensor 119 and, through a controller 136, supplies various control signals, such as clock signals and reference signals, to the other components in a conventional way. It also monitors the state of pushbutton 121, as will be described more specifically later.

The colorimetric signal processor 135 processes signals from the PD analog signal processor 134 to determine the colour of the SUT 113 and supplies a corresponding colour identification signal to voice synthesizer 128 which supplies a corresponding signal to speaker drive amplifier 129 causing loudspeaker 122 to enunciate the corresponding colour.

The PMOS switch 126 connects the voltage converter unit 125 to the positive terminal of battery 124, the negative terminal of which is grounded. When closed, switches 121 and 127, which are connected in parallel, connect the (control) gate of PMOS switch 126 to ground, causing switch 126 to close and connect the voltage converter 125 to battery 124. The voltage converter 125 then supplies the various other components of the colorimeter at whatever voltage is appropriate.

Figure 3:
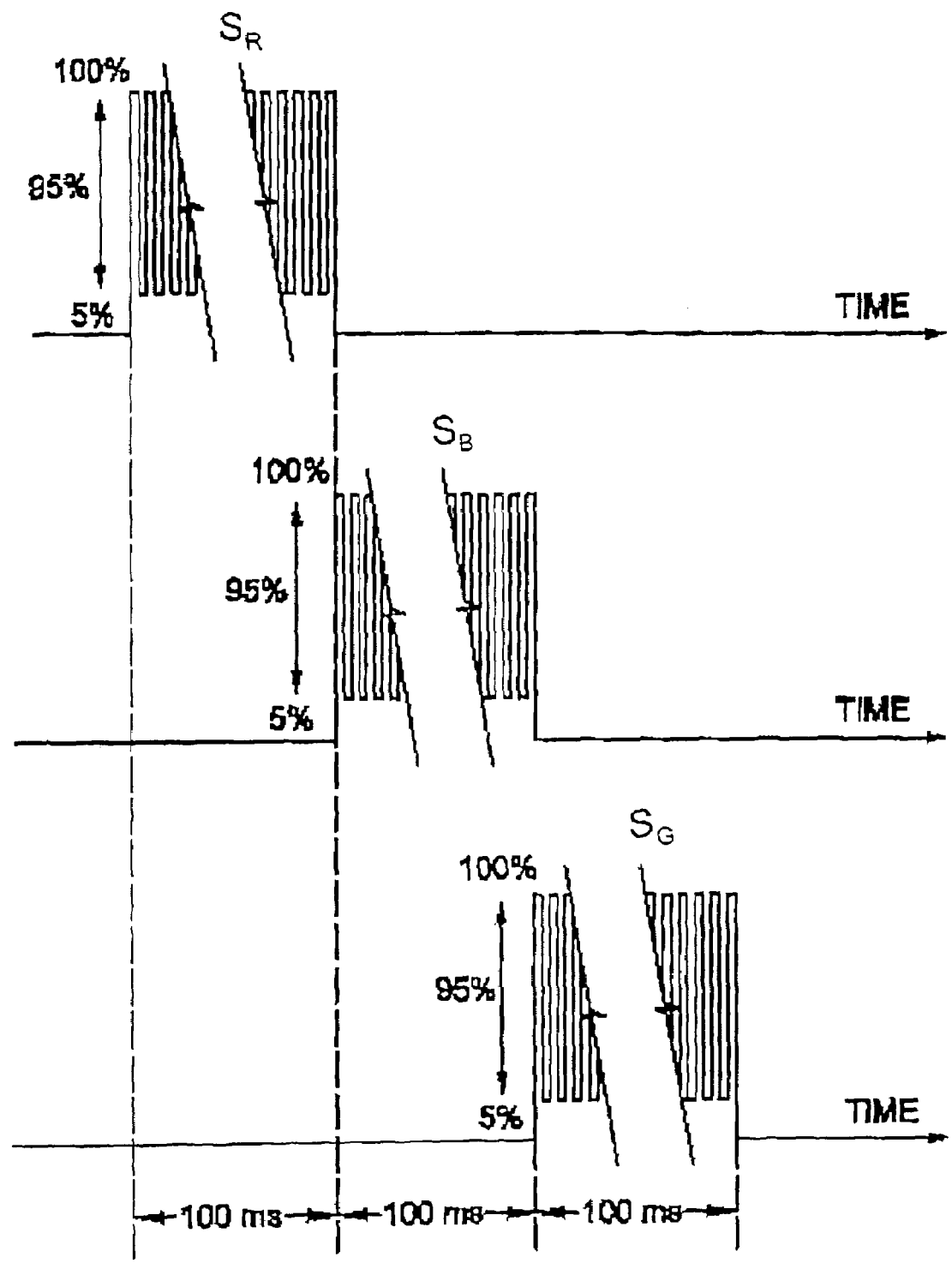
FIG. 3 illustrates sequential drive signals for driving LEDs in the colorimetric device.
Figure 5A:
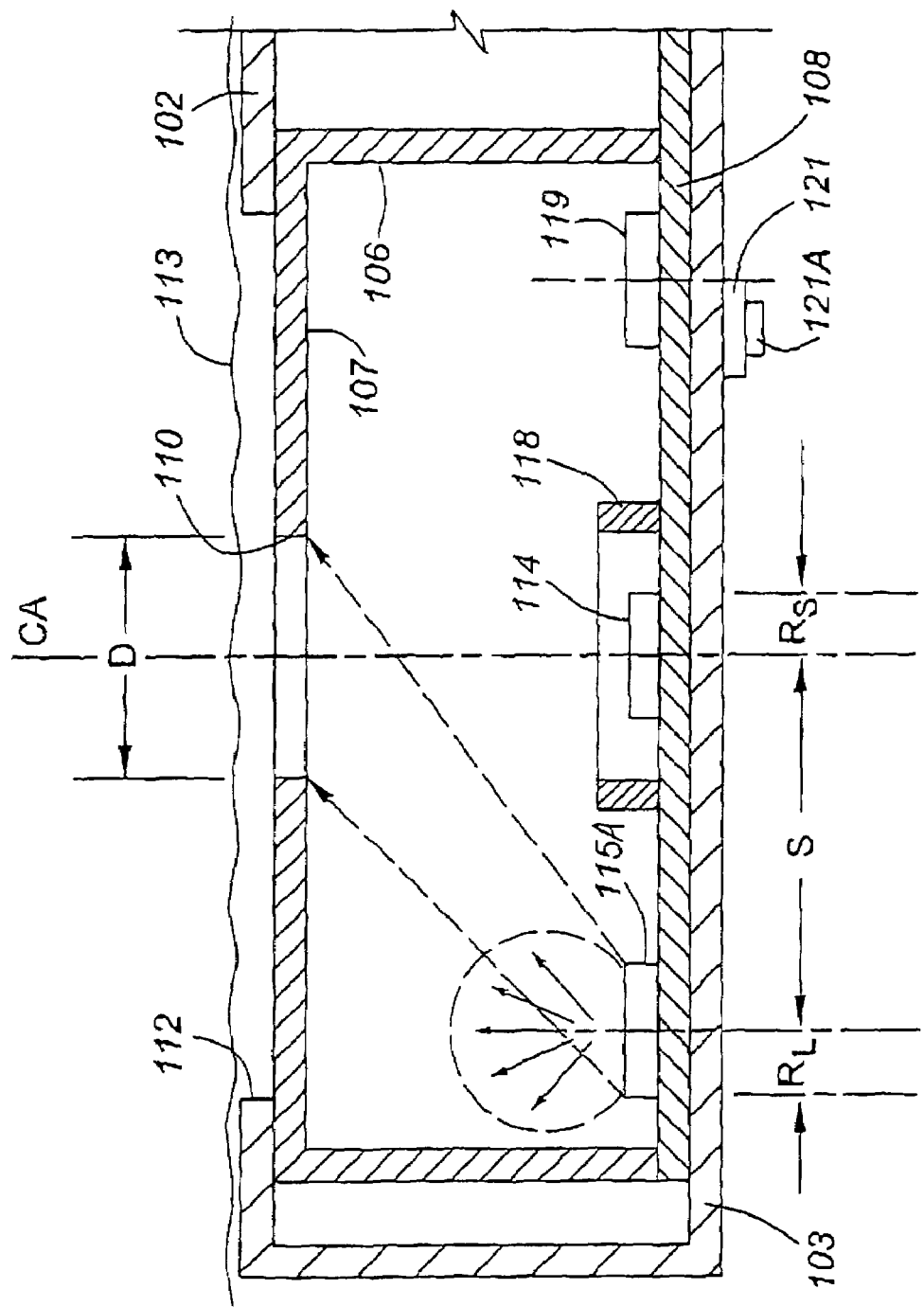
Figure 5B:
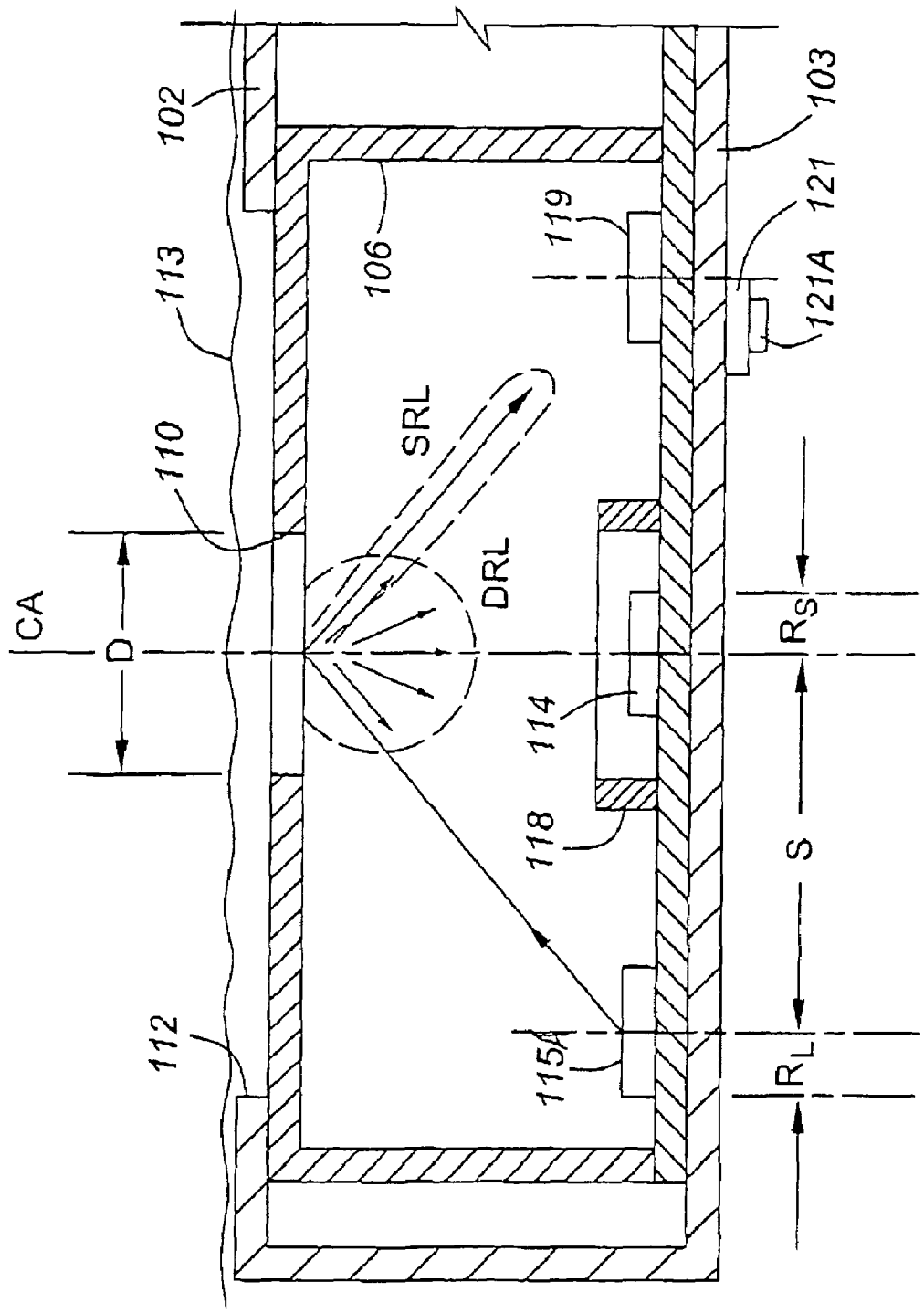

When the colorimeter 101 is not in use, the PMOS switch 126 is open and all components are off. To take a reading, the user places the colorimeter 101 onto the SUT 113 so that the aperture 110 is obscured and depresses the pushbutton switch 121, causing PMOS switch 126 to close. The colorimetric processor 135, by way of the controller 136 and amplifiers 131, 132 and 133, causes the LED pairs 115A/115B, 116A/116B and 117A/117B to be energized sequentially, as shown in FIG. 3, to illuminate the SUT 113, via the aperture 110. As illustrated in FIGS. 5A, 5B and 5C for LED 115A only, an incident ray L from each of the LEDs 115A, 115B, 116A, 116B, 117A and 117B reflected by the SUT 113 will generate specular and diffuse reflections SRL, DRL. Since the LEDs in each pair are energized simultaneously, there will be a single diffuse reflection DRL for each colour/pair. Each of the three diffuse reflections DRL constitutes a spectral sample of the light emitted by the corresponding one of the LED pairs 115A/115B, 116A/116B and 117A/117B and the three spectral samples will be used to determine the colour of the SUT 113 as will be described hereinafter.

Although, for ease of depiction and description, FIGS. 5A, 5B and 5C illustrate the ray diagram for only LED 115A, it will be appreciated that it applies analogously to LEDs 115B, 116A, 116B, 117A and 117B. Thus, FIG. 5A illustrates the Lambertian emission profile or polar diagram of the LED 115A. Referring to FIG. 5B, PD 114 is in the diffuse reflection lobe DRL but out of the way of the specular reflections lobe SRL. To ensure that specular reflections are directed away from the PD 114, the aperture 110 has edges such that the SUT 113 covering the aperture 110 is substantially parallel to the PCB 108, and its lateral dimension, specifically its diameter D, is less than the distance between each of the LEDs 115A, 115B, 116A, 116B, 117A and 117B and the PD 114. Specular reflections from the two surfaces of the window element 111 are also directed away from the PD 114, so there is no need to provide anti-reflection coatings on the two surfaces of window 111.

Referring to FIG. 5C, which illustrates the limiting case where a specular reflection just misses the PD 114, an upper bound for the diameter D of the aperture 110 is:

$$D < S - R_L - R_S \quad (1)$$

where: S is the centre-to-centre distance between each of the LEDs 115A, 115B, 116A, 116B, 117A, 117B and the PD 114;

$R_L$ is the radius of each of the LEDs 115A, 115B, 116A, 116B, 117A, 117B; and $R_S$ is the radius of the active area of PD 114.

In this boundary case, ray L, from an extremity of the active area of the LED 115A causes specular reflection SRL, to miss an extremity of the active area of the PD 114. Diffuse reflections DRL, still impinge on PD 114. It will be noted that the specular reflection SRL, is shown as a narrow lobe since there will be some dispersion as a result of roughness of the SUT 113. It should be appreciated that all of the lobe should avoid the PD 114.

The angle of incidence of the light $L_1$ from LED 115A on the SUT 113 is nominally 45 degrees from the normal to the SUT 113 (and hence the cylindrical axis CA) and the collection angle of the PD 114 to the SUT 113 also is nominally normal. As indicated before, the same applies to the light from LEDs 115B, 116A, 116B, 117A and 117B. These angular arrangements are consistent with the achievement of a transfer efficiency of the light power compatible with satisfactory operation of the equipment.

Typically, for a practical colorimeter 101, the circular aperture 110 would have a diameter of 7 mm and be spaced from the PD 114 by about 10 mm, and the distance S would also be about 10 mm. These dimensions are insensitive to any small variations, because of the wide angle emission characteristics of the LEDs 115A, 115B, 116A, 116B, 117A and 117B, and the wide field of view of the PD 114.

The relatively large size of the aperture 110, in conjunction with the wide angle emission characteristics of the LEDs 115A, 115B, 116A, 116B, 117A and 117B, causes substantially even illumination of the SUT 113, thereby ensuring that the colour determination will not be unduly affected by localized concentrations or patterns.

The diffuse reflections DRL can be considered to be samples of the red/orange, green, and blue light from the LED pairs 115A/115B, 116A/116B and 117A/117B, respectively, which impinges upon PD 114, each sample being over the band of wavelengths of the corresponding LED. The corresponding electrical signal generated by PD 114 contains a corresponding set of three sample values. The driving of the LEDs 115A, 115B, 116A, 116B, 117A and 117B, and the processing of the corresponding diffuse light samples, will now be described in more detail with reference also to FIG. 4. In order to separate the red/orange, green and blue spectral samples, a sequence of three successive pulses, each modulated by a subcarrier in the form of a square wave signal having a nominal frequency of 1 kHz, is applied to the three pairs of LEDs, one pulse to each pair in common, by LED drivers 131, 132 and 133 which drive the LED pairs 115A/115B, 116A/116B and 117A/117B sequentially, each with a subcarrier modulated burst of current of the same duration, typically 100 ms. The subcarrier modulation is a square wave signal having a nominal frequency of 1 kHz. These drive signals are labelled as $S_R$, $S_G$ and $S_B$, for the red/orange, green and blue samples, respectively.

The corresponding electrical signal generated by PD 114 will constitute three similar sequential pulses, comprising samples of the diffuse reflection of the red/orange, green, and blue light, respectively.

Figure 4:
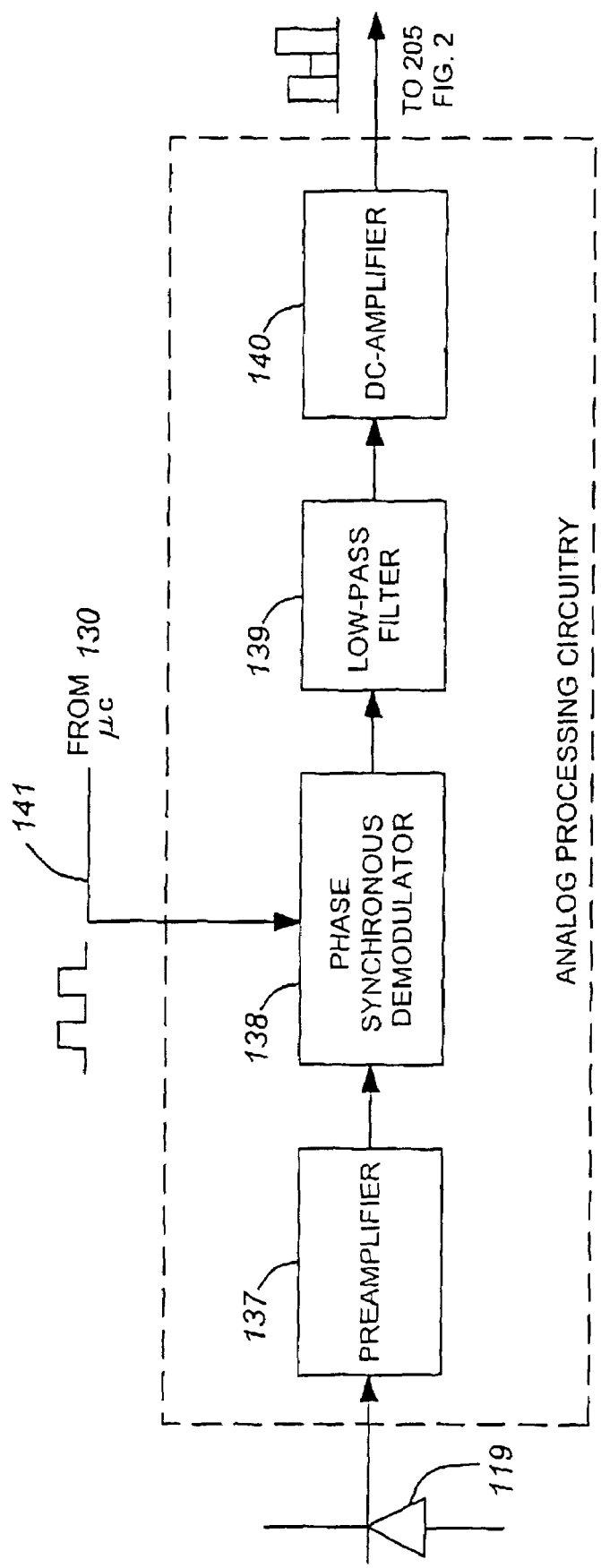
FIG. 4 is a block schematic diagram of analog processing circuitry for a photodetector of the colorimetric device.

The PD analog signal processor 134 demodulates the electrical signal from the PD 114 to produce corresponding red/orange, green, and blue sample values. As shown in FIG. 4, the PD analog signal processor 134 comprises a preamplifier 137, a phase synchronous demodulator 138, a low-pass filter 139, and a DC amplifier 140. Using a square wave reference signal received from the controller 136 via line 141, the phase synchronous demodulator 140 demodulates the subcarrier modulated samples and passes the demodulated samples to DC amplifier 140 via low-pass filter 139, which limits noise. The low-pass filter bandwidth is less than 10 Hz and is just sufficient to allow the signal to substantially reach its steady-state value by the end of the burst or pulse. This enhances the signal-to-noise ratio, further facilitating the use of low-power LEDs. DC amplifier 140 conditions the signal before supplying it to the processor unit 130 (FIG. 2).

Within the processor unit 130, which includes an analog-to-digital converter (not shown), the three sample values are segregated and digitized, then processed by the colorimetric signal processor 135 to determine a set of CIE colorimetric coordinates which correspond to the colour of the SUT 113.

In addition to controlling the phase synchronization of the subcarrier modulation and demodulation circuits, the controller 136 controls the time synchronization of the three modulated pulses and the sampling of the corresponding photocurrents.

The light outputs of the LEDs 115A, 115B, 116A, 116B, 117A and 117B drop by about 1 per cent per degree Celsius at a fixed drive current, so the colorimetric signal processor 135 applies a temperature correction to the sample values prior to the calculation of the luminous reflectivity and chromaticity values. The colorimetric signal processor 135 derives the temperature correction using a digital signal representing ambient temperature measured by the temperature sensor 119. Such temperature correction allows the LEDs 115A, 115B, 116A, 116B, 117A and 117B to be driven with a simple fixed constant current source circuit.

Before any actual measurements are made, the colorimeter must be calibrated, specifically the relationship between reflectivity and the afore-mentioned temperature-corrected voltages. This calibration is a two step process. In the first calibration step, the colorimeter 101 is operated with the aperture 110 left uncovered, so there are no reflections from an outside surface. The three LED sets are energized sequentially and the corresponding PD output voltages measured. These three voltages correspond to the offset values for each of the LED wavelength bands (red/orange, green, blue) and are primarily generated by stray reflections from the interior surfaces of the housing 106, both surfaces of the window 111 and, to a lesser extent, by the electronic circuitry. The offset values are stored in the processor unit 130 for use in subsequent measurements to generate offset error compensated spectrum sample values, In the second calibration step, the aperture 110 is covered with a reference white surface with a defined high reflectivity (e.g. 80-90%) and three measurements repeated The three voltages now acquired will be higher than those acquired in the first calibration step. The differences between each pair of "low" and "high" reflectivity voltages correspond to the dynamic range for each of the three LED wavelength bands and between the "low" and "high" reflectivities. The corresponding slope values also are stored in the processor unit 130 for use in subsequent measurements to correct for differences in the channel gains according to the LED wavelength band being sampled and thereby generate gain calibrated spectrum sample values. This ensures that the noise and quantization levels of the electrical drive signals are about equal for each of the LED wavelength bands.

If desired, the first calibration step could be performed with the aperture 110 covered by a black surface having a defined low reflectivity rather than left uncovered. The second step would again be performed with the aperture 110 covered with a white surface having a high defined reflectivity. The 'black' measurement would yield spectrum sample values corresponding to the offset errors and the defined low reflectivity. The 'white' measurements would yield spectrum sample values corresponding to the offsets and the defined high reflectivity. Using both 'black' and 'white' measurements, the offset and the gain values corresponding to the difference between the defined low and high reflectivities can be calculated and stored as described above.

When, subsequently, a reading is taken, the three sample values, i.e. the raw voltages ($v_r$, $v_g$ and $v_b$), are temperatures corrected and calibrated using the offsets and gain values to obtain three reflectivity values ($r_r$, $r_g$ and $r_b$). These reflectivity values are normalized as:

$$R_r = \frac{r_r}{r_r + r_g + r_b} \quad (2)$$

$$R_g = \frac{r_g}{r_r + r_g + r_b} \quad (3)$$

$$R_b = \frac{r_b}{r_r + r_g + r_b} \quad (4)$$

The colorimetric signal processor 135 uses a transform process to determine the CIE colorimetric coordinates of the colour of SUT 113 from the three normalized reflectivity values.

The normalized reflectivity values are related to the CIE chromaticity coordinates (u',v') as follows:

$$u' = \alpha_{1,1} R_r + \alpha_{1,2} R_g + \alpha_{1,3} R_b \quad (5)$$

$$v' = \alpha_{2,1} R_r + \alpha_{2,2} R_g + \alpha_{2,3} R_b \quad (6)$$

and to the luminous reflectivity value as:

$$Y = \beta_1 r_r + \beta_2 r_g + \beta_3 r_b \quad (7)$$

This, the matrix of transform coefficients for chromaticity values (u',v') is $$\alpha_{ij} = \begin{bmatrix} \alpha_{1,1} & \alpha_{1,2} & \alpha_{1,3} \\ \alpha_{2,1} & \alpha_{2,2} & \alpha_{2,3} \end{bmatrix} \quad (8)$$

and the matrix of transforming coefficients for the luminous reflectivity value, $Y_n$ is $$\beta_i = [\beta_1 \beta_2 \beta_3] \quad (9)$$

These transform coefficients for converting from each set of three normalized reflectivity values to corresponding CIE coordinates were determined empirically, during development of the invention, by using the colorimeter (or another identical colorimeter) to measure colours on a suitable commercially available colour check card whose CIE coordinates were known. A suitable such card is the Gretag Macbeth Color Checker (GMCC) Color Rendition Chart, which has 24 squares each comprising one of the known reference coloured surfaces and associated with each square, the corresponding CIE coordinates (luminous reflectivity Y and chromaticity values $u'_n, v'_n$). Thus, a total of 72 measurement were made, i.e., three for each of the 24 colours, and, using a spreadsheet, a "best fit" procedure performed to determine the optimum such transform coefficients that, when applied to the measurements, will give the best approximation to the known CIE coordinates specified for those colours.

The transform coefficients are stored in the memory of the processor unit 130 (and subsequently each production colorimeter during its manufacture). The reference measurements included six grey scale squares, i.e., black, white and four grey squares, since a user may scan black, white or grey articles, as well as coloured articles. Moreover, measurements on these six grey scale squares may be used to determine an "empirical" achromatic point for use when subsequently determining hue angles and saturation values, as will be described more fully later.

It will be appreciated that, once the transform coefficients have been obtained by measuring the known colours on the colour chart, they can be applied to the determination of colour coordinates of any colour.

When the colorimeter is in use, i.e., being used to determine a colour of a SUT, it obtains the three voltage readings and transforms them to obtain the set of CIE coordinates using the same procedure described above. The colorimetric signal processor 135 then determines whether or not the colour is encompassed by one of a plurality of contiguous colour volumes in three-dimensional colour space whose boundaries arc stored in memory of the processor unit 130 during manufacture, each colour volume being associated with a unique identifier.

The colour volumes each comprise at least one elemental volume defined by minimum and maximum limits for luminous reflectivity Y, saturation $s_{uv}$ and hue angle $h_{uv}$, and, in determining whether or not the colour is encompassed, the colorimetric signal processor 135 will compute the luminous reflectivity, hue and saturation values from the calculated coordinates (Y, u',v') and determine whether or not they lie between the respective limits.

Any number of colour volumes may be selected according to the application, but is has been found that forty-two are adequate for most applications and certainly for consumers use, for example to determine clothing colours.

The CIE definition of saturation $s_{uv}$ in so-called "u',v' colour space" is the distance of (u',v') from a central point, which corresponds to an achromatic point, usually referred to as a "white" point, multiplied by a factor of 13:

$$s_{uv}=13\sqrt{(u'-u'_w)^2+(v'-v'_w)^2} \quad (10)$$

where $u'_w$ and $v'_w$ are the chromaticity coordinates associated with the achromatic point.

The CIE definition of hue angle $h_{uv}$ is given by:

$$h_{uv}=\arctan\lfloor(v'-v'_w)/(u'-u'_w)\rfloor \quad (11)$$

As mentioned above, in preferred embodiments, empirically determined coordinates ($u'_w, v'_w$) of the achromatic point are used instead of the coordinates given by the manufacturer of the color check card. These empirically determined coordinates are calculated from measurements taken by the device on the six achromatic squares of the card, and averaged.

The so-called u'v' colour space, sometimes referred to as the CIE three-dimensional LUV colour space, is typically associated with the luminous reflectivity parameter L* (as the third coordinate). The CIE three-dimensional LUV colour space was defined so that the differences between colour locations are approximately proportional to the amount of subjective discrimination between the associated colours. It was found, however, in the development of this device, that an older standard for luminous reflectivity, namely the parameter Y mentioned above. was more appropriate because it is more linear. The Grelag MacBeth card used the luminous reflectivity coordinate L*, the two parameters L* and Y being related by the following equations:

$$L^*=116\,(Y/Y_0)^{1/3}\,16\text{ for L}>8 \quad (12)$$

$$L^*=903.3\,(Y/Y_0)^{1/3}\text{ for L}<8 \quad (13)$$

The boundaries for the colour volumes can be calculated in advance rather than determined empirically and, assuming the luminous reflectivity is defined along the vertical axis, approximated by horizontal sectors, where the hue determines the edge angles and the saturation is given by the distance from the achromatic centre. Difficulties may arise in assessing the boundaries between the achromatic centre and the various pale colours that surround it, so it is preferable, when calculating hue and saturation for the colour of the SUT, to determine the achromatic centre empirically, by measuring several achromatic squares, conveniently all six on the colour check card, and using an average of their measured coordinates instead of those specified by the chart manufacturer.

The speech synthesizer 128 stores the names of 42 colours, each colour name in association with a respective one of the unique identifiers. When the processor unit 130 has determined which of the above-described volumes encompasses the colorimetric coordinates of the SUT, it supplies the corresponding unique identifier to the speech synthesizer 128 which uses it to select and enunciate the name of the corresponding reference colour as being the colour of the SUT 113. The names may be stored in three languages and the language and volume of the speech synthesizer output may be selected by the user at any time. These settings are stored between subsequent operations of the device.

Figure 6:
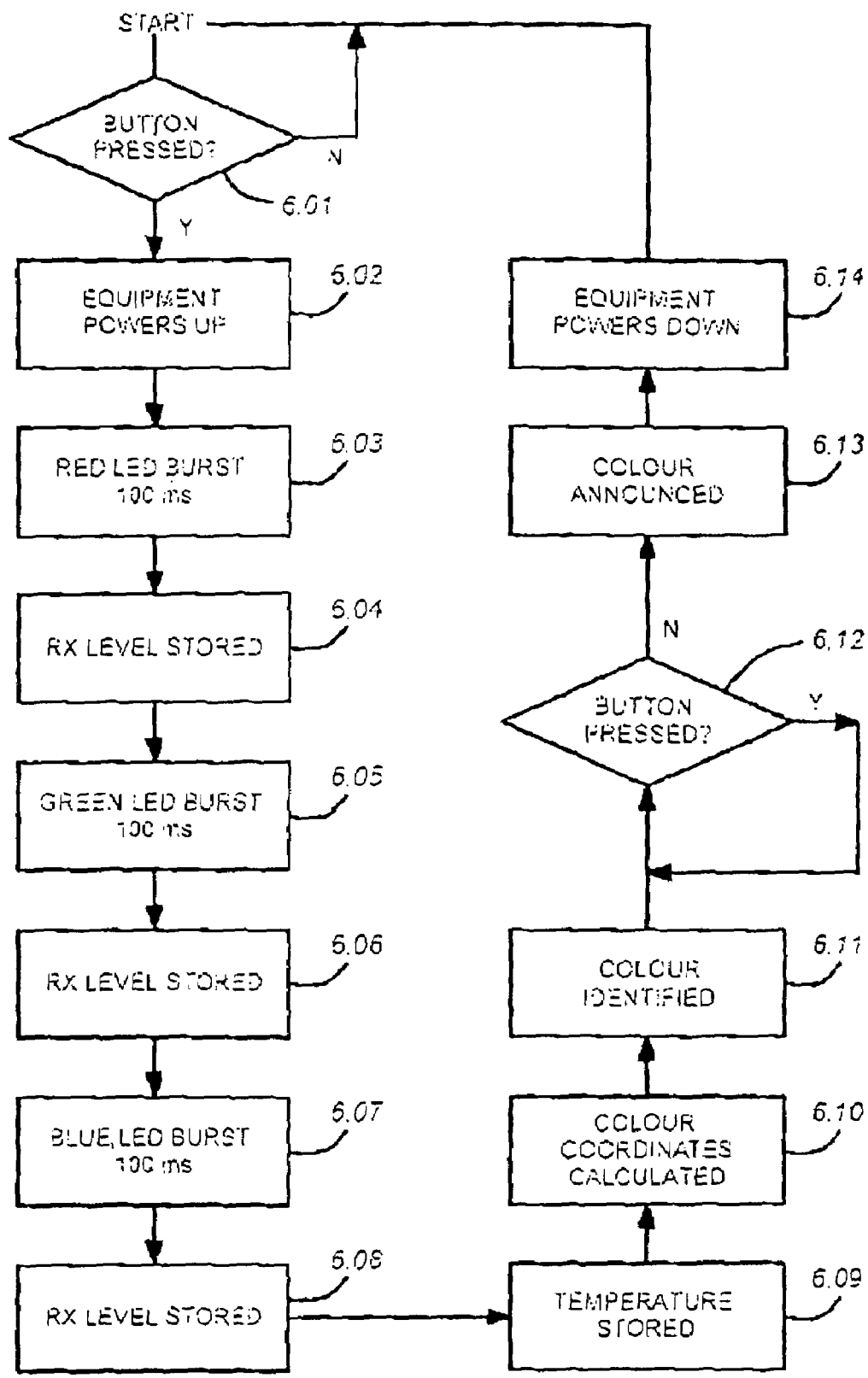
FIG. 6 is a flowchart depicting a colour determination process carried out by a processor in the colorimetric device.

Typical operation of the colorimeter 101 is illustrated by the flowchart shown in FIG. 6. When the user holds the colorimeter 101 on a SUT 113 whose colour is to be determined and presses the pushbutton 121, the colorimetric 101 powers up. In step 6.01, the processor unit 130 confirms that the pushbutton is depressed, and closes NMOS switch 127 to maintain the supply to the circuitry even if the pushbutton has been closed only momentarily. In step 6.02, the equipment powers up, and, in steps 6.03 to 6.08 the red/orange green, and blue LED pairs 115A/115B, 116A/116B and 117A/117B are energized sequentially and the corresponding measured red/orange, green, and blue spectrum sample values stored. In step 6.09, the processor unit 130 applies the temperature correction to the values and, in step 6.10, calculates the luminous reflectivity and chromaticity coordinates from the temperature corrected sample values using the transformation process described above and the stored transform coefficients. In step 6.11, the processor unit 130 determines which of the 42 colour space volumes contains the measured coordinates, and determines the corresponding one of the 42 colours to be the colour of the SUT 113. This step will be described in more detail later with reference to FIG. 7.

The processor unit 130 does not supply the result to the speech synthesizer 128 immediately, however. Rather, in step 6.12, the processor unit 130 determines whether or not the pushbutton 121 has been released. If it has not, the processor unit 130 "polls" it at intervals of, for example, one quarter second until it has been released. Only then does the processor 130 pass the selected unique identifier to the speech synthesizer 128 which, in step 6.13, announces the colour to the user. Finally, in step 6.15, the processor unit 130 releases NMOS switch 127 thereby opening PMOS switch 126, whereupon the equipment powers down.

In order to determine the colour of the SUT 113 from the three sample values, the processor unit 130 performs two processes, namely the transformation process (step 6.10) to determine the CIE coordinates, i.e., the luminous reflectivity and chromaticity (e.g. hue and saturation), from the measured spectrum sample values at the wavelength bands of the three LED pairs and then a colour identification process (step 6.11) to determine which of the colour space volumes encompass the measured coordinates.

Figure 7:
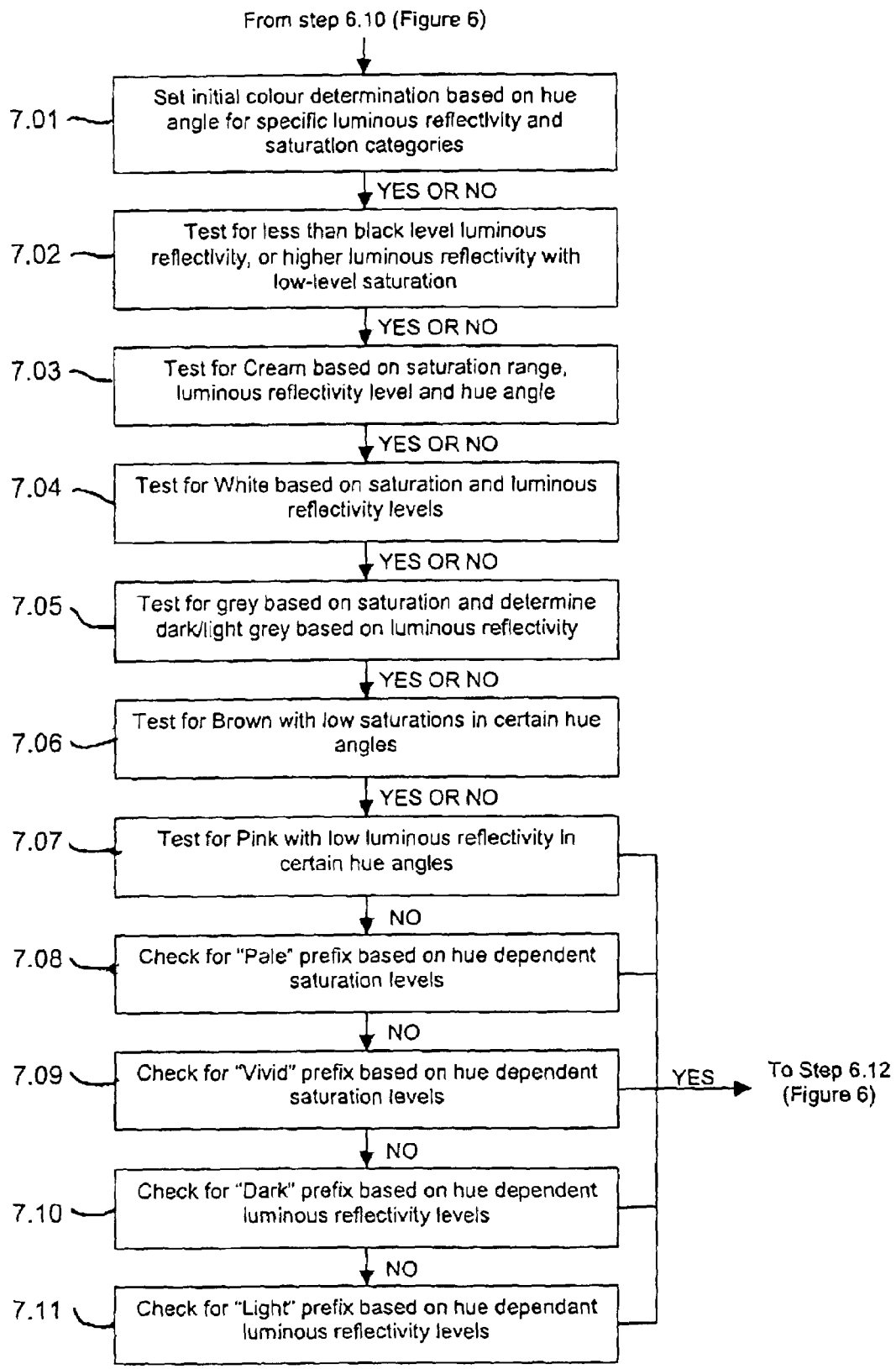
FIG. 7 is a flowchart depicting a series of steps carried out during the determination process.

The colour identification process of step 6.11 in FIG. 6 will now be described with reference to FIG. 7. In step 7.01, the processor unit 130 begins the colour identification process using the luminous reflectivity coordinate Y, saturation coordinate $s_{uv}$ and hue angle coordinate $h_{uv}$ for the SUT which it has in memory following step 6.10 (FIG. 6). Thus, it first determines the upper and lower limits of the luminous reflectivity "layer" within which the coordinate Y fits. Secondly, it determines the limits of the annular ring of saturation values within which the saturation coordinates $s_{uv}$ lies. Finally, it determines the limits of the sector of hue angles within which the hue angle coordinate $h_{uv}$ lies. This identifies the elemental colour volume which encompasses the three coordinates. This elemental colour volume will be one of a group which form a colour volume that is identified by name for output purposes. However, any particular colour may also be identified as "light", "dark" and so on, so a series of other determinations are made, as set out in FIG. 7.

In addition, there are certain parts of the colour space where the volumes associated with certain "colours", specifically black, cream, white, grey, brown and pink, are more difficult to discern as they are more complex. In step 7.01, the colorimetric signal processor 135 would have determined these "colours" to be some other basic colour; for example, creams to be orange, red or pink, and browns to be orange, yellow, red or pink. Blacks, whites and greys would have been identified by any trace hue detected, but might have been inappropriate to announce as such. The subsequent steps 7.02 to 7.07 determine which of these "difficult" colour volumes encompass the coordinates of the SUT.

The colorimetric signal processor 135 will step through each of the steps 7.01 to 7.06 in sequence regardless of the result associate with the step. At each of steps 7.07 to 7.11, however, if a "positive" result is achieved, the colorimetric signal processor 135 will go directly to step 6.12 of FIG. 6.

Thus, in step 7.02, the colorimetric signal processor 135 determines if the luminous reflectivity Y is less than a predetermined "black" level or if the luminous reflectivity is greater than this "black" level but the saturation $s_{uv}$ is lower than a predetermined saturation level. In step 7.03, the colorimetric signal processor 135 determines if the luminous reflectivity Y, saturation $s_{uv}$ and hue angle $_{uv}$ lie between the predetermined minimum and maximum limits for each associated with the colour cream. In step 7.04, the colorimetric signal processor 135 determines whether or not the luminous reflectivity Y, saturation $s_{uv}$ and hue angle $h_{uv}$ lie between the respective predetermined minimum and maximum limits for the "colour" white. In step 7.05 the colorimetric signal processor 135 determines if the "colour" of the SUT is grey based upon $s_{uv}$, and determines whether the grey is light or dark based upon the luminous reflectivity value. In step 7.06, the colorimetric signal processor 135 determines if, for low saturations $\delta_{uv}$, the hue angle $h_{uv}$ lies between the respective predetermined minimum and maximum limits for the colour brown. In step 7.07, the colorimetric signal processor 135 determines if, for low luminous reflectivity Y, the hue angle $h_{uv}$ lies between the respective predetermined minimum and maximum limits for the colour pink. If a "positive" result is obtained at step 7.07, i.e., the colour is still determined to be pink, the colorimetric signal processor 135 exits the colour identification process and proceeds to step 6.12 (FIG. 6).

If a "negative" result is obtained at step 7.07, indicating that, based upon the luminous reflectivity value, step 7.01 wrongly classified the colour as pink, the colorimetric signal processor 135 determines from the angle whether the colour should have been red or purple. At this point, the colour of the SUT has been identified, and the colorimetric signal processor 135 goes to step 7.08. The remaining steps 7.08, 7.09, 7.10 and 7.11 determine which of the qualifiers "pale", "vivid", "dark" or "light" is appropriate. The qualifiers "pale" and "vivid", corresponding to steps 7.08 and 7.09, respectively, are determined from the hue dependent saturation levels. The qualifiers "dark" and "light", corresponding to steps 7.10 and 7.11, respectively, are determined from the hue dependent luminous reflectivity levels. Steps 7.09 to 7.11 are alternatives because a user would not usually use two qualifiers, such as "pale, light", to describe a particular colour. It should be noted that the parameters used in the process of FIG. 7 are determined subjectively, since colour recognition is subjective. Following step 7.11, as described above, the colorimetric signal processor 135 exits the colour identification process and proceeds to step 6.12 (FIG. 6).

The above-described algorithm used to process the signals from the photodetector is particularly useful for determining a large number of non-standard colours. For some applications, however, such as industrial processes which sort products according to their colour, and hence the exact colours of the samples are known a priori, it might be preferable to store coordinates of known colours and use a least squares method to obtain the best fit of the measured coordinates with the known coordinates, similar to that described in PCT application WO 2004/079314, and summarized below.

The colorimetric signal processor 135 compares the set of CIE coordinates (Y, u', v') resulting from the transformation of the reflectivities determined from the voltage reading with sets of CIE coordinates stored in the memory of the processor unit 130 during manufacture, each associated with a unique identifier. These coordinates may be the coordinates determined from measurements of a colour check card as described above for the transform coefficient determination, or coordinates determined from measurements made during development of the invention on a selected number of sample surfaces, or coordinates selected for other reasons, according to application, during development of the invention.

As before, any number of colours may be selected, but in this case, it is likely that fewer will be needed, for example it is used in an industrial process. For clarity in the following description, it will be assumed that the CIE coordinates corresponding to the twenty-four (or more depending upon the colour check card used) reference colours are stored in the memory of the processor unit 130.

The comparison between the measured CIE coordinates (Y, u', v') and the stored CIE coordinates ($Y_m$, $u'_m$, $v'_m$) is performed using a least squares technique. The unique identifier associated with the stored coordinates that are closest in value to the measured coordinates is passed to the speech synthesizer. This (closeness) is determined from the mean square separation between each of the measured coordinates and the corresponding one of the stored coordinates as given by:

$$\Delta Y_m^2 - (Y - Y_m)^2 \quad (14)$$

$$\Delta H_m^2 = \frac{(u^l - u_m^l)^2 + (v^l v_m^l)^2}{2} \quad (15)$$

where $\Delta Y_m^2$ ad $\Delta H_m^2$ can each take values between zero and unity.

The composition mean square separation parameter is here defined as:

$$S_m^2 = w\Delta Y_m^2 + \Delta H_m^2 \quad (16)$$

where "w" is a weighting parameter between 0.1<w<10, the preferred value of which is unity.

$S_m^2$ therefore can take values between zero and "1+w".

Figure 8:
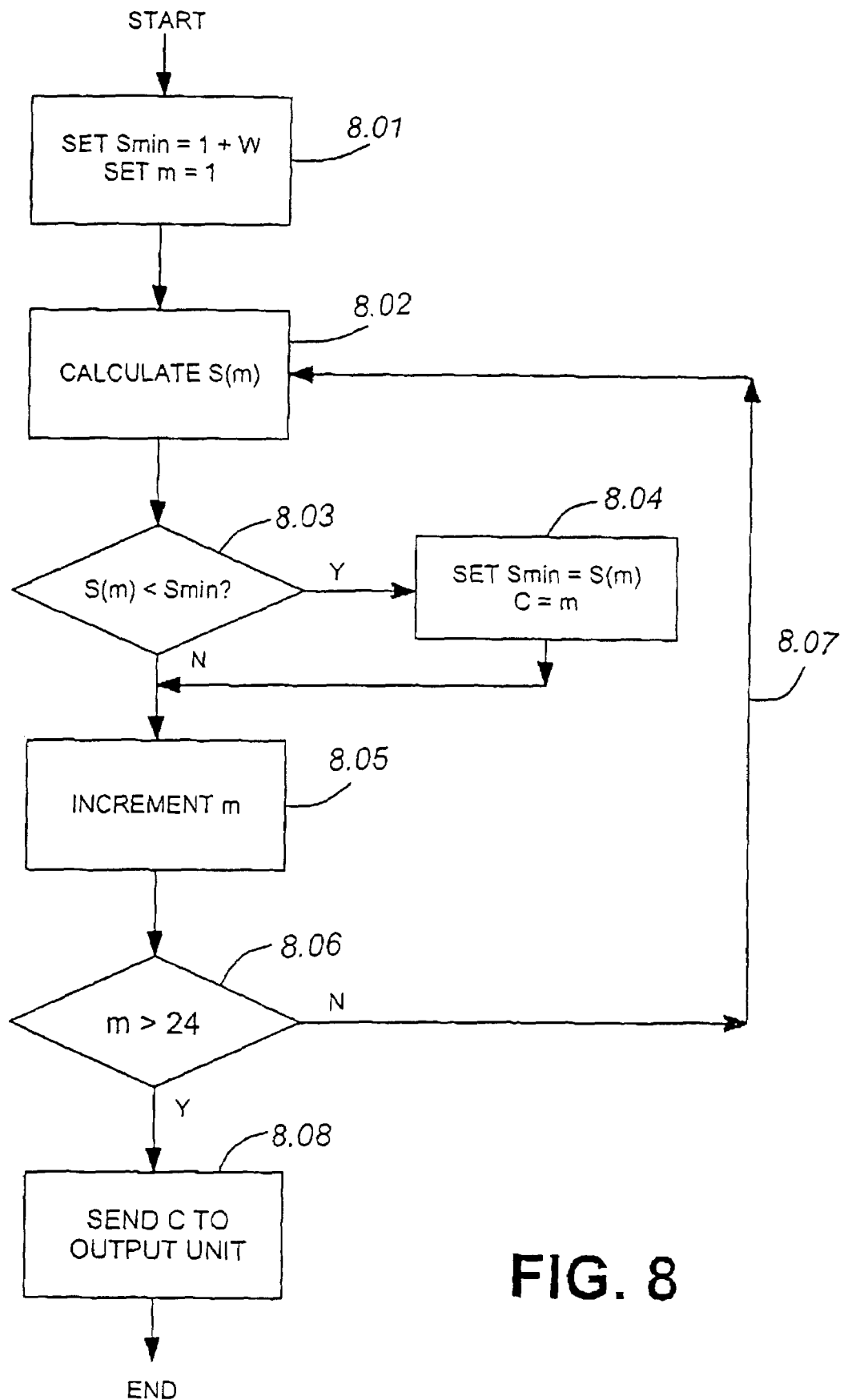
FIG. 8 is a flowchart depicting an alternative color determination process, namely a "best fit" process, for determining which of a set of reference colours is closest to the unknown colour.

The value of $S_m^2$ is calculated for each value of "m" and the smallest value obtained identifies the stored colour "m" that corresponds to the best fit to the colour of the SUT 113 covering the aperture 110. The mapping or selection process, as shown in FIG. 8, begins, in step 8.01, with the colorimetric signal processor 135 setting m=1 and $S_{min}$=1+w. $S_{min}$ is the updated value of minimum separation found so far during the selection process and C is the number associated with the best fit colour. Both occupy stores that can be updated. (S(m) is the same as $S_m^2$ as is used for convenience in the diagram).

In Step 8.02, the colorimetric signal processor 135 calculates S(m) for the colour m and in step 8.030 determines whether it is greater than the stored value of $S_{min}$. If it is, ii is, step 8.04 updates the stored values of $S_{min}$ and C and step 8.05 increments the value of m. If the calculated value for S(m) is not greater than $S_{min}$ m is incremented.

In step 8.06, the colorimetric signal processor 135 determines whether or not the calculation has been done for all twenty-four of the reference colours. If it has not, loop 8.07 returns to step 8.02 and the calculations are repeated for the next colour. When the measured coordinates have been compared with those of all of the stored colours, step 8.08 determines the colour identified as C to be the best fit and sends the identifier C to the speech synthesizer unit 128, which uses it to select the corresponding name of the reference colour, synthesizes the name as an analog signal, and supplies the analog signal via speaker drive amplifier 129 to loudspeaker 122 for audible announcement to the user.

The empirical determination of the transform coefficients $\alpha_{i,j}$ and $\beta_i$ which is done during the development process (as described above), preferably uses a least mean squares algorithm similar to the algorithm described in the present applicant's above-mentioned copending international patent application No. PCT/CA2003/000326, and a similar colorimeter, i.e., with LEDs and a photodiode having the same characteristics and with the same geometry as those used in the production colorimetric 101, to measure each colour of the reference chart in turn. (While it is convenient to use the same used in the production models, it is not essential).

The measurements from the three channels, i.e., the colorimetric coordinate set for each reference coloured surface derived from the corresponding three sample values, for each reference colour are entered into a computer spreadsheet (e.g. a Microsoft Excel spreadsheet) that contains the transform formulae with the coefficients $\alpha_{i,j}$ and $\beta_1$ as variables. Using a standard best fit procedures which is available with standard computer spreadsheets, these variables are optimized such that the colorimetric coordinates calculated from the reference measurements are as close as possible in the colorimetric coordinates for the reference colours, as supplied by the manufactures of the reference chart. During this empirical determination process, the six grey scale squares are used to calibrate the gain of each channel.

The resulting numerical values of $\beta_i$, j=1 to 3, and $\alpha_{i,j}$, i=1 to 3, j=1 to 3 are stored in the colorimetric signal processor 135 and used when the colorimeter is actually in use. It is envisaged that the same transform coefficients will be used for all production versions of the colorimeter, on the assumption that the variations between units will be so small that the quality of the colour determination will not be degraded unduly. Nevertheless, greater accuracy could be obtained by calibrating each colorimeter with he colour chart, during production, to select the best transform coefficients for that particular colorimeter.

Once labeled with its transform coefficients and reference colour information, but before use, the colorimeter 101 will be factory calibrated to correct for offsets and gain differences in the three colour channels using the calibration process described above with reference to the determination of the coefficients. The same factory calibration may be performed for colorimeters having three or more LEDs.

It should also be appreciated that the transformation algorithm for determining colorimetric coordinates for SUT 113, and the algorithm for comparing measured colorimetric coordinates with the boundary surfaces of the colour space volumes corresponding to various colours, could be used independently of each other and also could be employed with colorimeters which do not have the sensor unit described herein. Conversely, the sensor unit described herein could be used in colorimeters employing different algorithms to process the reflected light and determine the colour of the SUT being scanned.

Various modifications may be made to the above-described embodiment without departing from the scope of the invention, some of which will now be described.

Thus, with some combinations of LEDs and PD, the amount of light that directly impinges upon the PD is negligible, so the low cylindrical shield 118 surrounding the PD 114 may be omitted.

Also, more that six LEDs may be used in the colorimeter 101 for higher precision in the colour determination for more stringent applications. Generally, a similar geometry as that of colorimeter 101 may be used provided that the LEDs are disposed so that diffuse reflections are directed to the PD 114 and specular reflections are directed away from the PD 114. One such modification will now be described with reference to FIGS. 9 and 10.

Figure 9:
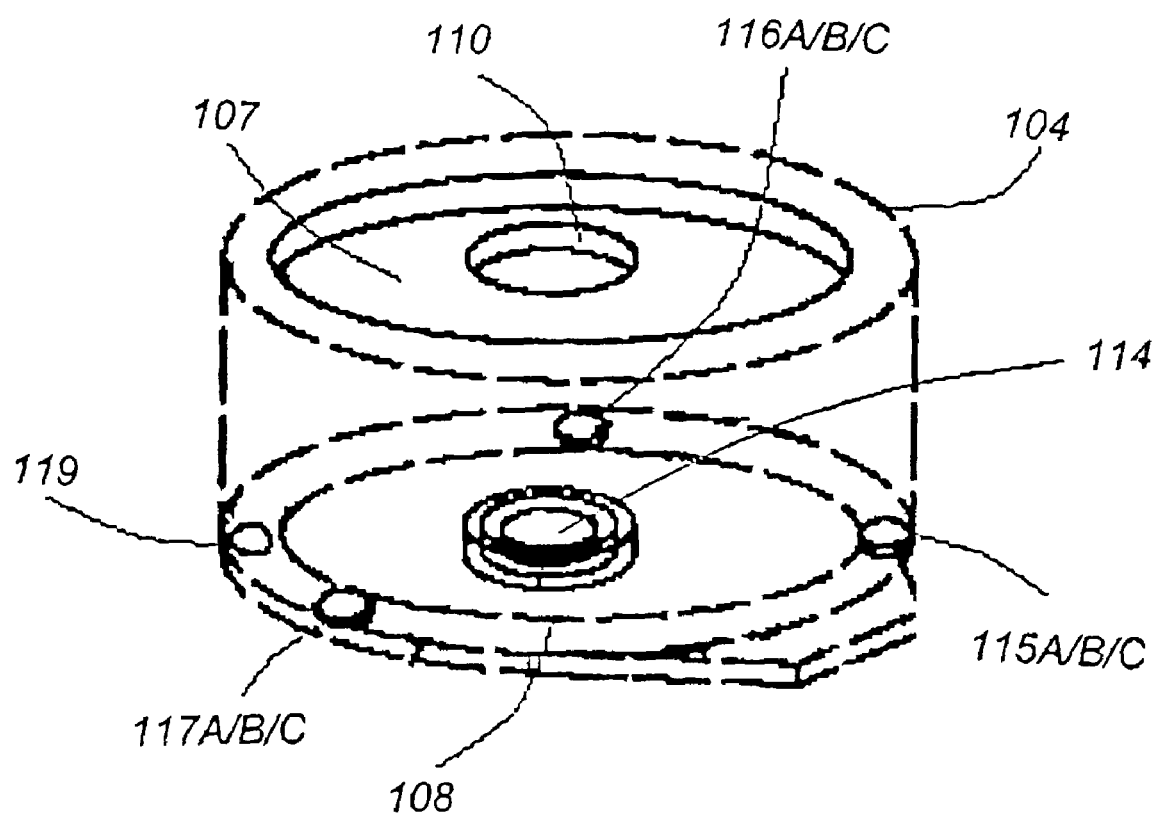
FIG. 9 illustrates a modification to the colorimetric device of FIG. 1.
Figure 10:
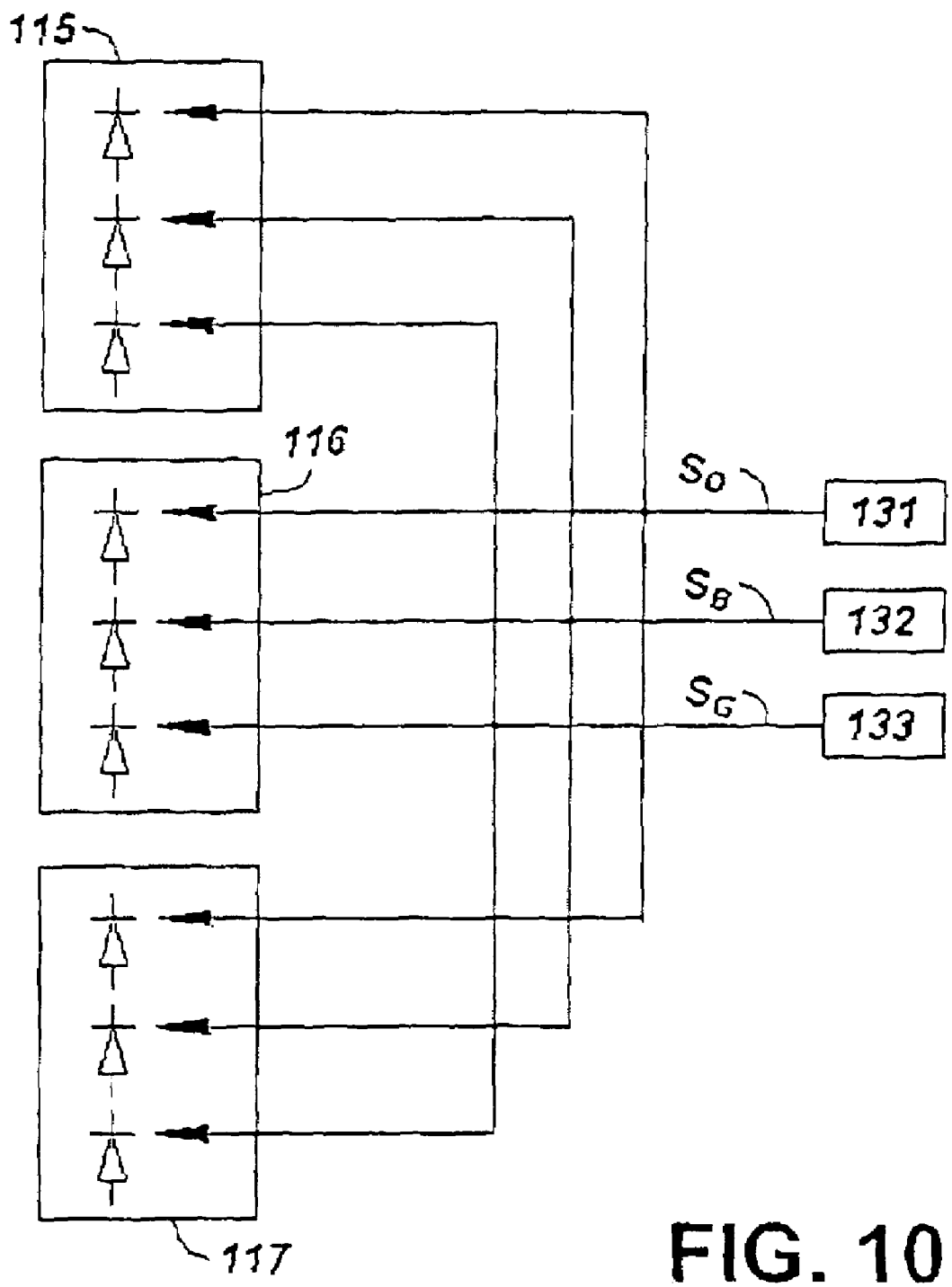
FIG. 10 illustrates a corresponding modification to the circuit shown in FIG. 2.

As shown in FIG. 9, the light sources comprise nine LEDs arranged in sets of three. Each of the sets 115A/B/C, 116A/B/C and 117A/B/C comprises and red/orange LED (suffix A), a blue LED (suffix B) and a greed LED (suffix C) in a single package. A suitable "tricolour" product comprising three such LEDs in one package is available from Stanley Electric as product No. FAGB1312CPE. The three sets 115A/B/C, 116A/B/C, 117A/B/C are equally spaced angularly relative to each other around the PD 114. The detection scheme, signal processing and analysis are substantially the same as for the above described preferred embodiment. The drive signals $S_R S_R S_r$ for each particular colour of LED are sent from the drive amplifiers 131, 132, and 133, respectively, to the packages 115A/B/Cm 116A/B/C, 117A/B/C sequentially as show in FIG. 3 for the preferred embodiment. Each of the drive signals is sent to the corresponding one of the LEDs in each of the packages 115A/B/C, 116A/B/C, 117A/B/C, in parallel, such that all of the LEDs of a particular colour are driven simultaneously. Such a parallel drive is illustrated in FIG. 10, which illustrates a portion of the circuit of FIG. 2 suitably modified.

In addition, more than three spectral samples may be taken, i.e., a plurality of LEDs emitting light in more than three spectral segments may be used in the colorimeter 101 for higher precision in the colour determination for more stringent applications. Generally, a similar geometry to that of colorimeter 101 may be used provided that the LEDs are disposed so that diffuse reflections are directed to the PD 114 and specular reflections are directed away from the PD 114.

The factory calibration with more than three spectral samples would have to be adapted. Thus, assuming n LEDs or n LED sets, n>3, the factory calibration in terms of offset value and gain value calibration would have to be performed for each of the n spectrum sample values rather than three as preciously described.

Moreover, the temperature correction of the n spectrum sample values due to the drop of the light output of the LEDs with increasing temperature may be similarly performed as described above.

Furthermore, the luminous reflectivity value Y would be calculated as a weighted average of the n spectrum sample values at the n LED wavelengths.

$$Y = \Sigma_j \beta_j r_j \qquad (17)$$

wherein $r_j$, j=1 to n are the n spectrum sample values; and
$\beta_j$, j=1 to n are n transform coefficients which depend on the set of n LEDs used in colorimeter 101.

Likewise, the chromaticity coordinates (u',v') would be calculated from the n sample spectrum as follows:

$$u' = \Sigma_j \alpha_{1,j} R_j \qquad (18)$$

$$v' = \Sigma_j \alpha_{2,j} R_j \qquad (19)$$

wherein $K_j$, j=1 to n are the n spectrum sample values; and
$\alpha_{ij}$, i=1 to 2 and j=1 to n is a colour transform matrix having matrix elements that are dependent on the n spectral samples from the LEDs used in colorimeter 101.

The determination of the numerical values of $\beta_j$, j=1 to n, and $\alpha_{ij}$, i=1 to 3 to n would follow the same procedure as the one described for n=3 hereinbefore. The spreadsheet would require a small modification to factor in the n spectrum sample values to produce the n numerical values of $\beta_j$ and the 3 n numerical values of $\alpha_{ij}$.

The determination of the colour of the SUT 113 from its luminous reflectivity and chromaticity values using a colorimeter 101 having n LED pairs with n>3, may use either the first-described colour space volumes method or the second-described "best fit" method.

The colorimeter could use other non-visual forms of communicating the determined colour in a user, such as a tactile, e.g. Braille-based output, either in addition to, or instead of, the audible announcement.

The wavelengths and spectral widths of the LEDs shift slightly with temperature in a range from 0.22 nm/degree C. to 0.1 nm/degree C. This dependency may be compensated for by making the numerical values of $\alpha_{ij}$ and $\beta_i$ in equations 5, 6 and 7, respectively, temperature dependent.

To minimise noise, the PD 114 may be operated at zero bias.

The preamplifier 137 in analog signal processing circuitry 134 may feature a low-noise transimpedance pre-amplifier, conveniently mounted on the underside of PCB 108 opposite to the location of the PD 114. The interconnections between PD 114 and the pre-amplifier 137 would then be very short, minimizing sensitivity to electromagnetic interference (EMI).

A pre-amplifier 137 having a very low noise level enables satisfactory operation at low LED light levels This can be achieved with a FET from end and a high value transimpedance, typically 10 Megohm. A suitable device is the LMC6484 operational amplifier manufactured by National Semiconductor Corp. This enables the use of inexpensive, low-power LEDs operated well below their rating to ensure long life, stability and reliability.

The synchronous demodulator 138 may multiply its input signal synchronously by +1 and −1, thereby using the entire signal rather than part of the signal.

It will be seen from FIG. 3 that a modulation depth of 95% is used for greatly reducing the voltage swing on the LEDs, thereby minimizing electromagnetic interference (EMI) to the sensitive preamplifier. It should be noted, however that, the actual modulation current applied to the LEDs is symmetrical about an average level.

Although subcarrier modulation is not essential to obtain the spectrum sample values, the use of subcarrier modulation substantially eliminated the effects of interfering natural or artificial background light and DC drift of the preamplifier 137. This permits the colorimeter 101 to operate at very low signal levels, allowing the LEDs to be operated at low drive currents in the order of 1 mA. and removes the need for any light guide or focusing optics to conserve light energy by increasing the light transfer efficiency.

Although the above-described sequential driving of the three light sources (three LED pairs) is preferred, it would be possible to energize them simultaneously providing their respective sample values can be discriminated. Thus, a Frequency-Division Multiplex (FDC), or a Code-Division Multiplex (CDM) format may be used. In the FDM format, the LEDs would be driven simultaneously but the light sources in each pair or set having the same wavelength would have their drive signal modulated at a different subcarrier modulation frequency. An FDM Electrical Signal Processor would demultiplex the three (or more) spectral samples based on the individual subcarrier modulation frequencies.

In the CDM format too, the three (or more) LED pairs would be driven simultaneously, but each pair would be continuously amplitude modulated with a respective one of a set mutually orthogonal codes. A CDM Electrical Signal Processor would demultiplex the three (or more ) spectral samples based on the individual orthogonal codes.

The FDM and CDM formats advantageously would provide an AC signal component such that no DC direction response would be required; moreover the AC component should be spectrally separated from those AC signals caused by artificial lighting, usually powered by mains AC supplies of 50 Hz or 60 Hz and generating spectral components of their respective harmonies.

The FDM and CDM formats require the frequency or code to demodulate the required component. For speed, a plurality of demodulators could be used in parallel rather than having to use a single demodulator in a serial mode.

It will be appreciated that light sources other that LEDs could be used, such as electroluminescent devices.

The specular reflection from real surfaces that are not perfectly smooth is such that the angles of reflection have a narrow distribution of angles surrounding the nominal angle of reflection that equals the angle of incidence. For this reason, the above-described colorimeter, wherein 45 degrees separate the diffuse reflections from the specular reflections, advantageously provides an ample margin to ensure that no specular components are collected.

The withholding of the announcement of the colour while the pushbutton 121 is still depressed facilitates use in a noisy environment or by a user who is hard of hearing since it allows the user to hold the colorimeter close to one ear before releasing the pushbutton and listening to the announcement of the name of the colour. It should be noted that this advantageous feature could be employed with other hand-held sensors, including colorimeters, which do not have the specific sensor unit construction described herein or even employ the same algorithms as the colorimeter 101 described herein. Thus, this aspect of the invention is not limited to colorimeters at all, but could be applied to other devices for scanning text and providing an aural output.

It should be noted that the sizes of the colour volumes will differ and my do so according to their location in the CIE colour chart. For example, a greater number of smaller colour volumes might be provided is some areas and a smaller number in others. Generally, the distribution and sizing of the colour volumes may compensate for non-uniformity of the CIE chromaticity chart with respect to human colour perception. Moreover, the "thickness" of the volume cells i.e. the differences between their respective luminous reflectivity limits, may vary.

It should also be noted that, although the above-described embodiments employ CIE coordinates, the invention embraces the use of other colorimetric coordinate schemes, or even other kinds of colorimetric references.

Although embodiments of the invention are of benefit for determining the colour of garments by the blind or colourblind, it should be appreciated that embodiments of the invention may be used for other purposes, for example domestic consumer purposes (paint, furnishings, etc.) or as a colour learning aid for young children.

It should also be appreciated that, while it is preferred to provide, the name of the colour as an audio output, it could be displayed, since the colour blind, for example, would be able to read a LED or LCD display. Of course, an audio output would probably be inappropriate in industrial applications.

It should be noted that while LEDs emitting red/orange, blue and green light are used in the above-described embodiments, it would be possible to use LEDs that emit light in other spectral segments that are sufficiently spaced by wavelength.

It should be appreciated that the empirical determination of the coordinates of the achromatic point may use either or both of the "white" and "black" reflectivity measurements taken when calibrating the temperature-corrected voltages for the development colorimeter(s). Moreover, the intervening grey scale square readings could be taken at the same time, though used later. The achromatic point measurements could be made using several similar devices and averaging.

While it is preferred to use an empirically determined achromatic point obtained by several grey scale measurements because it reduces the likelihood of errors when measuring surfaces having colours that are close to the achromatic point, it should be appreciated that, where such accuracy is not an issue, it might be possible to use the coordinates obtained by measuring only the white square, or coordinates supplied, for example, by a colour card manufacturer, or the so-called Dω point which is approximated to the spectrum from light from a black body source with a temperature of 6500° K. (i.e. u'=0.1978 and v'=0.4684).

It should be noted that the "white" and "black" reflectivity measurements are the only grey scale measurements made upon each production colorimeter, to calibrate its dynamic range. The achromatic point coordinates will be loaded into each production colorimeter along with the colour volume or best fit coordinate data.

In the foregoing embodiments of the invention, the temperature-corrected and calibrated reflectivity values $r_g$, $r_b$, $r_r$ are transformed to CIE coordinates by the colorimetric signal processor 135 and the CIE coordinates are used to identify the colour using either the color volumes or the "best fit" approach. It should be appreciated, however, that the transformation to CIE coordinates could be omitted and the reflectivity values themselves used as the "coordinate" to access the colour volumes or determine the best fit. In such a case, the colour volumes, or the "best fit" reference colours, would be defined using RGB reflectivity values.

INDUSTRIAL APPLICABILITY

An advantage of embodiments of this invention is that they are especially useful for determining the colour of non-isotropic textured surfaces, such as some fabrics which appear to be a different colour depending upon the "illumination" direction relative to the nap of the pile. More particularly, and advantageously, embodiments of the invention which employ three co-located different colour light sources (e.g., tricolor LEDs) with 120 degree spacing are largely immune to textural vectorial influences.

Furthermore, colorimeters embodying the present invention are inexpensive and rugged because of the total absence of optical filters, light pipes/guides, lenses, mirrors, reflector cones, or other such optical elements.

Although an embodiment of the invention has been described and illustrated in detail, it is to be clearly understood that the same is by way of illustration and example only and not to be taken by way of the limitation, the spirit and scope of the present invention being limited only by the appended claims.

The invention claimed is:

1. A colorimetric device for determining the colour of a surface-under-test (SUT) which, when illuminated, will produce at least diffusely reflected light, comprising:
   a housing including a wall having an aperture therein, interior surfaces of the housing being adapted to absorb light impinging thereon, the aperture to be covered by the SUT when the colorimeter is in use;
   light source means and photodetector means disposed in the housing and generally facing the aperture, the light source means being responsive to electrical drive signals for emitting light in at least three different spectral segments each encompassing a different band of wavelengths, the light source means being spaced apart so as to direct light of a particular said wavelength band towards the aperture from at least two directions, the photodetector means being disposed so as to receive said diffusely reflected light after reflection from said SUT covering the aperture;
   the colorimetric device further comprising:
   a drive unit for supplying said electrical drive signals to the light source means so as to cause them to emit said light of each of the three different wavelength bands and means for processing the corresponding electrical output signal from the photodetector means to provide three values each corresponding to a respective one of the three different wavelength bands, the drive unit and processing means being so configured that each of said values is distinct from the other values, the processing means being configured to derive from the at least three values a set of colorimetric coordinates identifying the colour of the SUT.

2. A colorimetric device according to claim 1, wherein the processor uses the colour coordinates to determine the name of the colour and the colorimeter further comprises output means for outputting the name audibly and/or visually and/or tactilely.

3. A colorimetric device according to claim 1, wherein the light source means and the photodetector means are spaced apart so that substantially all of light from said light source means that is specularly reflected by the SUT is directed away from the PD and the PD will receive at least a portion of the diffusely reflected light from each light source and produce a corresponding electrical output signal having a plurality of values each dependent upon the diffuse reflection characteristics of the SUT for the corresponding wavelength band.

4. A colorimetric device according to claim 1, wherein the light source means comprise three pairs of light sources, the light sources in each pair being disposed either side of the photodetector means and emitting light of substantially the same wavelength, the different pairs emitting light in said different bands of wavelengths and being angularly spaced apart around the photodetector means, the processor being operable to energize each pair of light sources to obtain the corresponding one of said values at the corresponding wavelength.

5. A colorimetric device according to claim 4, wherein the six light sources are spaced at equal intervals around the photodetector, the light sources in each pair being opposite each other.

6. A colorimetric device according to claim 1, wherein the light source means comprise three sets, each set comprising first, second and third substantially co-located light sources for supplying light at first, second and third wavelengths, respectively, each in a respective one of the three different bands of wavelengths, the sets being angularly spaced apart around the photodetector means, the processor being operable to energize all of the first light sources to obtain said value at the first wavelength, energize all of the second light sources to obtain said value at the second wavelength, and energize all of the third light sources to obtain said value at the third wavelength.

7. A colorimetric device according to claim 6, wherein the first, second and third light sources in each set are packaged as a single device.

8. A colorimetric device according to claim 4, wherein the light sources for emitting light of the same wavelength band are energized simultaneously.

9. A colorimetric device according to claim 4, wherein the light sources for emitting light of the same wavelength band are energized in quick succession and the successive values combined.

10. A colorimetric device according to claim 1, wherein said light source means are operable to emit light of the three different wavelength bands sequentially.

11. A colorimetric device according to claim 1, wherein said wavelength bands correspond to the colours red/orange, green, and blue.

12. A colorimetric device according to claim 11, wherein said wavelength bands have spectral maxima at, respectively, approximately 610 nanometers, approximately 555 nanometers, and approximately 450 nanometers.

13. A colorimetric device according to claim 1, wherein the light source means comprise LEDs.

14. A colorimetric device according to claim 13, wherein the LEDs and the photodiode means are planar semiconductor devices, the LEDs having wide angle emission characteristics and the PD having a wide angle field of view.

15. A colorimetric device according to claim 14, wherein the LEDs and the photodiode are surface mount devices.

16. A colorimetric device according to claim 1, further comprising a temperature sensor for generating ambient temperature information for use by the processor to correct for temperature dependency of the light output from the light source means when deriving said coordinates from said values.

17. A colorimetric device according to claim 16, wherein the temperature sensor is mounted on a PCB carrying the light source means.

18. A colorimetric device according to claim 17, wherein the temperature sensor is a surface mount device.

19. A colorimetric device according to claim 1, further comprising shielding means for preventing direct irradiation of the photodetector means by the light source means.

20. A colorimetric device according to claim 1, further comprising modulation means for subcarrier modulating the electrical drive signals and demodulation means for demodulating the electrical output signal.

21. A colorimetric device according to claim 20, wherein the subcarrier modulation has a square waveform.

22. A colorimetric device according to claim 20, wherein the demodulation means comprises a phase synchronous demodulator synchronized to the phase of the subcarrier modulating means.

23. A colorimetric device according to claim 20, wherein the modulation depth is less than unity.

24. A colorimetric device according to claim 23, wherein the modulation depth is approximately 95%.

25. A colorimeter according to claim 1, wherein the processor means determines the colour of the SUT by determining whether or not the derived colorimetric coordinates are within any one of a plurality of defined contiguous volumes in three-dimensional colour space, each of said volumes being associated with a unique identifier, and identifying the colour of the SUT as the colour represented by the volume encompassing the calculated coordinates.

26. A colorimeter according to claim 25, wherein each colour volume comprises at least one elemental volume defined by saturation limits, luminous reflectivity limits and hue angle limits, and the processing means determines whether or not the saturation value, luminous reflectivity value and hue angle of the derived coordinates lie between said saturation limits, luminosity limits and hue angle limits, respectively.

27. A colorimeter according to claim 26, wherein each colour volume comprises a plurality of said elemental volumes that are each contiguous with one or more neighbouring said elemental volumes.

28. A colorimeter according to claim 27, wherein the elemental volumes have different sizes.

29. A colorimeter according to claim 26, wherein the saturation and hue angles are measured about an achromatic point whose coordinates are predetermined empirically by measuring a series of reference achromatic samples and taking the avenge of their coordinates as the coordinates of the achromatic point.

30. A colorimeter according to claim 1, wherein the processor stores a plurality of sets of colorimetric coordinates corresponding to a plurality of known colours, respectively, and uses a best fit algorithm to determine the known colour coordinates closest to the derived coordinates of the colour of the SUT and adopts said known colour coordinates as representative of the colour of the SUT.

31. A colorimetric device according to claim 1, wherein the processor means derives the derived colorimetric coordinates from the electrical signal using a set of stored transform coefficients previously determined using a best fit routine between colorimetric coordinates calculated from reflectivity measurements made on reference surfaces with known colorimetric coordinates and their known colorimetric coordinates.

32. A colorimetric device according to claim 1, wherein the processor means uses a set of stored/predetermined transform coefficients to derive from the electrical signal a set of colorimetric coordinates including luminous reflectivity coordinate (Y) and chromaticity coordinate (u',v') together representing the colour of the SUT;
the processor means storing a plurality of sets of colorimetric coordinates corresponding, respectively, to a plurality of known colours, and for using a best fit algorithm to determine the known colorimetric coordinates closest to the calculated coordinates of the colour of the SUT and adopts said known colorimetric coordinates as representative of the colour of the SUT.

33. A colorimetric device according to claim 32, further comprising means for outputting the name of the particular colour by one or more of audible visual and tactile means.

34. A colorimetric device according to claim 32, wherein:
the processor means derives luminous reflectivity coordinate (Y) and chromaticity coordinates (u',v') of the SUT covering the aperture from the spectrum sample values;
the luminous reflectivity coordinate Y being calculated as a weighted average of the n spectrum sample values as follows:

$Y = \Sigma_j \beta_j r_j$ wherein $r_j$, j=1 to n are the n spectrum sample values; and
$\beta_j$, j=1 to n are n transform coefficients which depend on the set of n LEDs used in the colorimetric device;
the chromaticity coordinates (u',v') being calculated from the n normalized sample spectrum values as follows:

$u' = \Sigma_j \alpha_{1,j} R_j$ $v' = \Sigma_j \alpha_{2,j} R_j$ wherein $$R_j = \frac{r_j}{\sum_j r_j}, j = 1$$

to n are the n normalized spectrum sample values; and
$a_{ij}$, i=1 to 2 and j=1 is a colour transform matrix having matrix elements that are dependent on the n spectral samples from the LEDs used in the colorimetric device.

35. A colorimetric device according to claim 34, wherein the processor determines the best fit using a least mean square difference criterion as follows:

$S_m^2 = w\Delta Y_m^2 + \Delta H_m^2$ wherein $S_m^2$ is a mean square difference criterion;
w is a weighting transform factor with 0.1<w<10;
$\Delta Y_m^2 = (Y - Y_m)^2$ is a reflectivity mean square difference criterion;

$$\Delta H_m^2 = \frac{(u^l - u_m^l)^2 + (v^l - v_m^l)^2}{2}$$

is a chromaticity mean square difference criterion; and the least value of $S_m^2$ for m=1 to k, k being the number of stored reference colours, is deemed to be the best fit.

36. A colorimetric device according to claim 1, further comprising user-operable activation means, wherein:
upon activating of the activation means the colorimetric device determines the colour of the SUT covering the aperture; and
upon de-activating the activation means the colorimetric device communicates the determined colour to the user.

37. A method of determining an unknown colour of a substance comprising the steps of:
(i) irradiating the substance using light in at least two different spectral segments each encompassing a different band of wavelengths,
(ii) detecting light diffusely reflected from the substance and producing a corresponding electrical signal, and
(iii) using a set of stored/predetermined transform coefficients, calculating from the electrical signal a set of colorimetric coordinates including luminous reflectivity (Y) and chromaticity values (u,v) representing the colour of the surface-under-test (SUT);
(iv) determining whether or not the calculated colorimetric coordinates are within any one of a plurality of previously-defined contiguous volumes in three-dimensional colour space, the unknown colour being determined as the colour represented by the volume encompassing the calculated coordinates.

38. A method according to claim 37, wherein each colour volume comprises at least one elemental volume defined by saturation limits, luminosity limits and hue angle limits, and the determining step determines whether or not the derived coordinates for the unknown colour lie within said elemental volume.

39. A method according to claim 38, wherein each colour volume comprises a plurality of said elemental volumes that are each contiguous with one or more neighbouring elemental volumes.

40. A method according to claim 39, wherein the elemental volumes have different sizes.

41. A method according to claim 37, wherein the hue angles are measured about an achromatic point whose coordinates are predetermined empirically by measuring a series of achromatic samples and taking an avenge of their coordinates as the coordinates of the achromatic point.

42. A colorimetric device for determining the colour of a surface-under-test (SUT) which, when illuminated, will produce at least diffusely reflected light, comprising:
a sensor unit having light source means for irradiating the SUT,
photodetector means for detecting light diffusely reflected from the SUT and producing a corresponding electrical signal, and
processor means for using a set of stored/predetermined transform coefficients to derive from the electrical signal a set of colorimetric coordinates including luminous reflectivity coordinate (Y) and chromaticity coordinates (u',v') together representing the colour of the SUT;

wherein the processor means determines the colour of the SUT by determining whether or not the derived colorimetric coordinates are within any one of a plurality of previously-defined contiguous volumes in three-dimensional colour space, the unknown colour being determined as the velour represented by the volume encompassing the derived coordinates.

* * * * *